United States Patent
Watanabe et al.

(10) Patent No.: US 12,503,024 B2
(45) Date of Patent: Dec. 23, 2025

(54) CONVEYANCE SEAT

(71) Applicant: TS TECH CO., LTD., Saitama (JP)

(72) Inventors: Hironori Watanabe, Tochigi (JP);
Hiromi Taniguchi, Tochigi (JP);
Akihiko Sato, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 84 days.

(21) Appl. No.: 18/026,606

(22) PCT Filed: Sep. 17, 2021

(86) PCT No.: PCT/JP2021/034422
§ 371 (c)(1),
(2) Date: Mar. 16, 2023

(87) PCT Pub. No.: WO2022/059792
PCT Pub. Date: Mar. 24, 2022

(65) Prior Publication Data
US 2023/0347802 A1 Nov. 2, 2023

Related U.S. Application Data

(60) Provisional application No. 63/083,205, filed on Sep. 25, 2020, provisional application No. 63/080,830, filed on Sep. 21, 2020.

(51) Int. Cl.
*B60N 2/68* (2006.01)
(52) U.S. Cl.
CPC .................. *B60N 2/682* (2013.01)
(58) Field of Classification Search
CPC .................................... B60N 2/682
See application file for complete search history.

(56) References Cited

U.S. PATENT DOCUMENTS

| 7,237,846 B1 | 7/2007 | Arima | |
|---|---|---|---|
| 8,985,696 B2 * | 3/2015 | Yasuda | B60N 2/68 297/452.36 |

(Continued)

FOREIGN PATENT DOCUMENTS

| JP | S62-131933 U | 8/1987 |
|---|---|---|
| JP | S63-175448 U | 11/1988 |

(Continued)

OTHER PUBLICATIONS

International Search Report mailed on Nov. 30, 2021, for the corresponding PCT Application No. PCT/JP2021/034422, with English machine translation.

(Continued)

*Primary Examiner* — Philip F Gabler
(74) *Attorney, Agent, or Firm* — Michael Best & Friedrich LLP

(57) ABSTRACT

A side frame has a connection structure enabling response to various welding methods during inter-member connection and improving post-welding connection strength in a conveyance seat that has the side frame including divided members. Each of a pair of side frames of a conveyance seat is configured from at least a first member and a second member divided in a longitudinal direction, the first member has a first connecting portion for connection to the second member, the second member has a second connecting portion for connection to the first member, and the first connecting portion and the second connecting portion respectively have flat surface portions extending in the longitudinal direction, and the first member and the second member are connected in a state where flat surfaces of the flat surface portion of the first connecting portion and the flat surface portion of the second connecting portion face and overlap each other.

13 Claims, 21 Drawing Sheets

(56) References Cited

U.S. PATENT DOCUMENTS

| | | | |
|---|---|---|---|
| 10,414,307 B2 * | 9/2019 | Suzuki | B60N 2/68 |
| 10,457,167 B2 * | 10/2019 | Mochizuki | B60N 2/682 |
| 10,518,677 B2 * | 12/2019 | Suzuki | B60N 2/686 |
| 10,576,857 B2 * | 3/2020 | Poulos | B60N 2/688 |
| 2014/0232161 A1 | 8/2014 | Mitsuhashi | |
| 2017/0327009 A1 | 11/2017 | Kim et al. | |
| 2018/0201169 A1 | 7/2018 | Hashimoto et al. | |
| 2020/0247291 A1 | 8/2020 | Hashimoto et al. | |
| 2020/0282885 A1 | 9/2020 | Onuma | |
| 2021/0300220 A1 | 9/2021 | Hashimoto et al. | |
| 2023/0347802 A1 | 11/2023 | Watanabe et al. | |

FOREIGN PATENT DOCUMENTS

| | | |
|---|---|---|
| JP | H06-046552 A | 2/1994 |
| JP | 2006-051272 A | 2/2006 |
| JP | 2009-137390 A | 6/2009 |
| JP | 2010-046162 A | 3/2010 |
| JP | 2010-120490 A | 6/2010 |
| JP | 2010-158464 A | 7/2010 |
| JP | 2012-040921 A | 3/2012 |
| JP | 2014-156213 A | 8/2014 |
| JP | 2018-076007 A | 5/2018 |
| JP | 2018-161909 A | 10/2018 |
| JP | 2019-055683 A | 4/2019 |
| JP | 2019-073101 A | 5/2019 |
| JP | 2019-177880 A | 10/2019 |
| WO | 2017/018491 A1 | 2/2017 |
| WO | 2022/059792 A1 | 3/2022 |

OTHER PUBLICATIONS

Japanese Office Action mailed on Mar. 4, 2025 from the Japan Patent Office (JPO) for the related Japanese Patent Application No. 2021-152415, with English machine translation.

Japanese Office Action mailed on Sep. 16, 2025 for the corresponding Japanese Patent Application No. 2022-127400, with English machine translation.

Japanese Office Action mailed on Oct. 14, 2025 for the corresponding Japanese Patent Application No. 2022-127401, with English machine translation.

* cited by examiner

FIG. 11
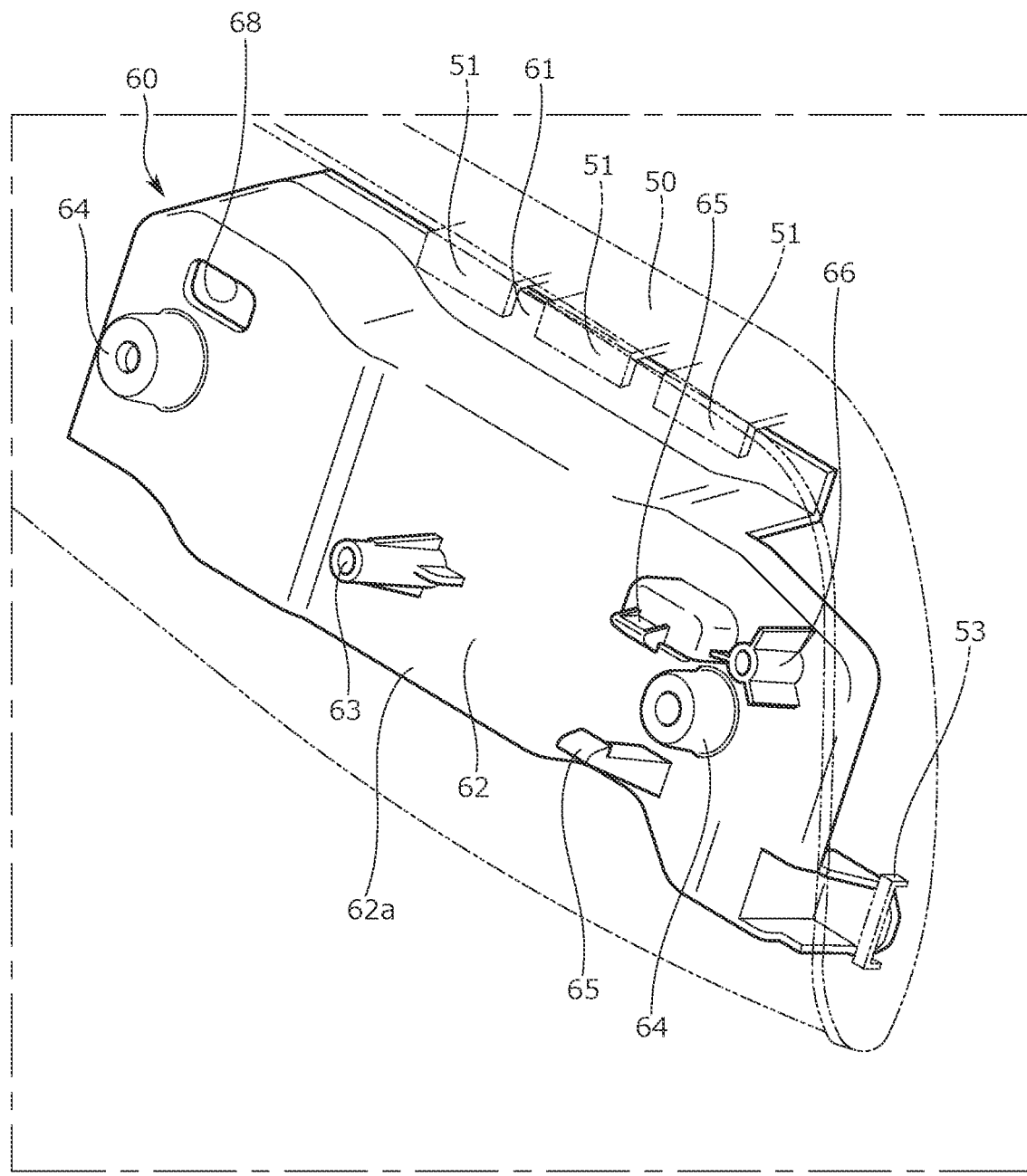
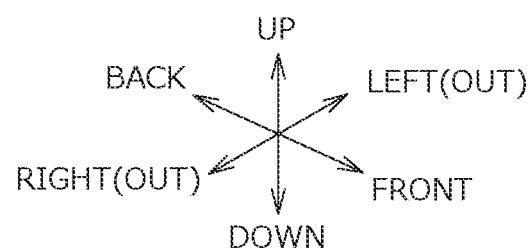

FIG. 13
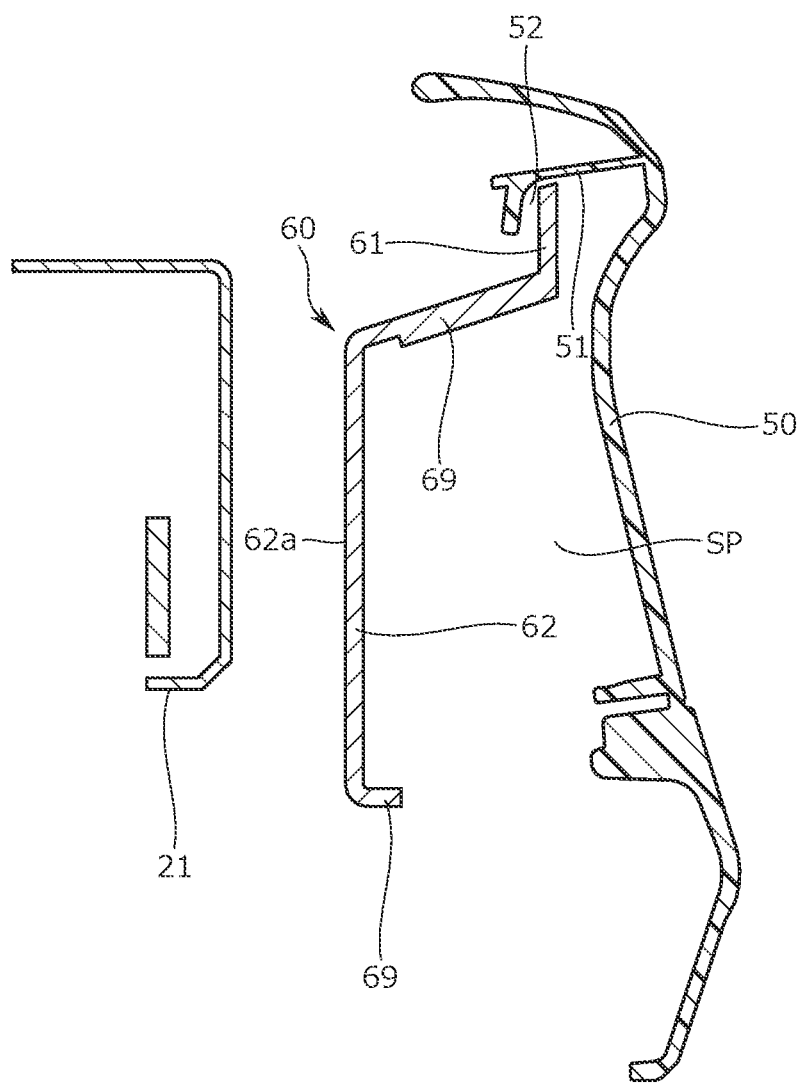
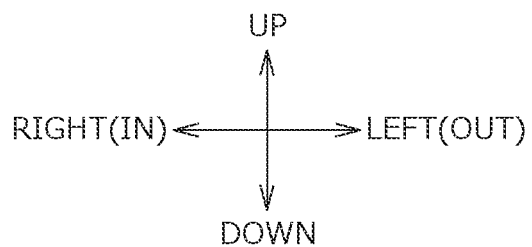

CONVEYANCE SEAT

CROSS-REFERENCE TO RELATED APPLICATIONS

This application is a National Entry application of PCT Application Serial Number PCT/JP2021/034422, filed Sep. 17, 2021. Further, this application claims priority from U.S. Provisional Application No. 63/080,830, filed Sep. 21, 2020, and U.S. Provisional Application No. 63/083,205, filed Sep. 25, 2020, the entire contents of which are hereby incorporated by reference into this application.

TECHNICAL FIELD

The present invention relates to a conveyance seat. More particularly, the present invention relates to a conveyance seat that has side frames.

BACKGROUND ART

A back frame that forms the skeleton of the back seat of a vehicle seat is configured from a pair of right and left side frames and an upper frame and a lower frame connecting the side frames. In addition, PATENT LITERATURE 1 discloses a multi-member side frame divided in the up to down direction.

CITATION LIST

Patent Literature

PATENT LITERATURE 1: JP 2006-51272 A

SUMMARY OF INVENTION

Technical Problem

The side frame described in PATENT LITERATURE 1 is formed by welding a plurality of abutting members. However, the welding method in welding the abutting members is limited to laser welding, and thus it was difficult to perform connection by various welding methods and there were concerns over insufficient post-joining strength.

The present invention has been made in view of the above problems, and an object of the present invention is to provide a side frame that has a connection structure enabling response to various welding methods during inter-member connection and improving post-welding connection strength in a conveyance seat that has the side frame including a plurality of divided members.

Solution to Problem

The above object is achieved by means of a conveyance seat including a seat main body and a seat frame forming a skeleton of the seat main body, in which the seat frame has a pair of side frames disposed so as to be separated from each other in a seat width direction, each of the pair of side frames is configured from at least a first member and a second member divided in a longitudinal direction, the first member has a first connecting portion for connection to the second member, the second member has a second connecting portion for connection to the first member, and each of the first connecting portion and the second connecting portion has a flat surface portion extending in the longitudinal direction, and the first member and the second member are connected in a state where flat surfaces of the flat surface portion of the first connecting portion and the flat surface portion of the second connecting portion face and overlap each other.

According to the conveyance seat described above, the first member and the second member of the side frame are connected in a state where the flat surfaces of the flat surface portion of the first connecting portion extending in the longitudinal direction and the flat surface portion of the second connecting portion extending in the longitudinal direction face and overlap each other. Connection occurs in a wider area than in the case of butt joining, and thus it is possible to respond to various welding methods and post-welding connection strength is also improved. Therefore, it is possible to provide a conveyance seat with a side frame that has a connection structure enabling response to various welding methods during inter-member connection and improving post-welding connection strength.

In addition, in the conveyance seat described above, the first member and the second member may be formed to differ from each other in plate thickness or material type.

By the first member and the second member being formed to differ from each other in plate thickness or material type, the side frame can be formed with appropriate weight or strength as necessary.

In addition, in the conveyance seat described above, one of the first connecting portion of the first member and the second connecting portion of the second member may be positioned inside the other.

By positioning one of the first connecting portion and the second connecting portion inside the other, the strength of the connecting portion can be improved.

In addition, in the conveyance seat described above, the one of the first connecting portion and the second connecting portion positioned inside may be formed as a stepped portion, and an outside surface of the first member and an outside surface of the second member may be flush with each other in a state where the first member and the second member are connected.

By forming one of the first connecting portion and the second connecting portion as a stepped portion, the side frame is made compact in size in the seat width direction. In addition, positioning is facilitated and assemblability is improved. As a result of the assemblability improvement, the manufacturing time of the conveyance seat can be shortened and cost reduction can be achieved.

In addition, in the conveyance seat described above, the one of the first connecting portion and the second connecting portion positioned inside may be formed with a flange extending inward from a side portion, and the other may be flange-less.

Since the one of the first connecting portion and the second connecting portion positioned inside is formed with the flange portion and the other is flange-less, overlapping can be performed from the seat width direction as well as the longitudinal direction and the assemblability of the first member and the second member is improved.

In addition, in the conveyance seat described above, a length in the seat width direction of one of the first connecting portion and the second connecting portion positioned inside may be longer than a length of the other in the seat width direction.

Welding is facilitated since the length in the seat width direction of the one of the first connecting portion and the second connecting portion positioned inside is longer than the length of the other in the seat width direction.

In addition, in the side frame of the conveyance seat described above, an opening portion may be formed at a position avoiding the first connecting portion or the second connecting portion.

A decline in connection strength is suppressed since the opening portion used for a harness clip hole or the like is formed at a position avoiding the first connecting portion or the second connecting portion.

In addition, in the conveyance seat described above, the seat frame may be a seat back frame forming a skeleton of a seat back serving as a backrest portion, and the pair of side frames may be back side frames of the back frame.

By dividing the back side frame, the back side frame can be formed by, for example, combining different plate thicknesses or material types.

In addition, in the conveyance seat described above, the seat frame may be a seat cushion frame forming a skeleton of a seat cushion serving as a seating portion, and the pair of side frames may be cushion side frames of the seat cushion frame.

By dividing the cushion side frame, the cushion side frame can be formed by, for example, combining different plate thicknesses or material types.

Advantageous Effects of Invention

According to the conveyance seat of the present invention, the first member and the second member of the side frame are connected in a state where the flat surfaces of the flat surface portion of the first connecting portion extending in the longitudinal direction and the flat surface portion of the second connecting portion extending in the longitudinal direction face and overlap each other. Connection occurs in a wider area than in the case of butt joining, and thus it is possible to respond to various welding methods and post-welding connection strength is also improved. Therefore, it is possible to provide a conveyance seat with a side frame that has a connection structure enabling response to various welding methods during inter-member connection and improving post-welding connection strength.

In addition, by the first member and the second member being formed to differ from each other in plate thickness or material type, the side frame can be formed with appropriate weight or strength as necessary.

In addition, by positioning one of the first connecting portion and the second connecting portion inside the other, the strength of the connecting portion can be improved.

In addition, by forming one of the first connecting portion and the second connecting portion as a stepped portion, the side frame is made compact in size in the seat width direction. In addition, positioning is facilitated and assemblability is improved. As a result of the assemblability improvement, the manufacturing time of the conveyance seat can be shortened and cost reduction can be achieved.

In addition, since the one of the first connecting portion and the second connecting portion positioned inside is formed with the flange portion and the other is flange-less, overlapping can be performed from the seat width direction as well as the longitudinal direction, the first member and the second member are overlapped with ease, and assemblability is improved.

In addition, welding is facilitated since the length in the seat width direction of the one of the first connecting portion and the second connecting portion positioned inside is longer than the length of the other in the seat width direction.

In addition, a decline in connection strength is suppressed since the opening portion used for a harness clip hole or the like is formed at a position avoiding the first connecting portion or the second connecting portion.

In addition, by dividing the back side frame, the back side frame can be formed by, for example, combining different plate thicknesses or material types.

In addition, by dividing the cushion side frame, the cushion side frame can be formed by, for example, combining different plate thicknesses or material types.

BRIEF DESCRIPTION OF DRAWINGS

FIG. 11 is a perspective view in which a base cover is seen from the inside of the vehicle seat.

FIG. 13 is a cross-sectional view taken along line XIII-XIII in FIG. 10.

FIG. 16 is an exploded perspective view illustrating the cushion side frame that has the switching unit and so on.

DESCRIPTION OF EMBODIMENTS

Hereinafter, the configurations of conveyance seats according to embodiments of the present invention will be described with reference to the drawings. However, the embodiments described below are for easy understanding of the present invention and do not limit the present invention. In other words, the present invention can be modified and improved without departing from the spirit thereof, and it is a matter of course that the present invention includes equivalents thereof.

In addition, in the following description, content related to the material, shape, and size of a seat component is merely a specific example and does not limit the present invention.

It should be noted that in the following description, vehicle seats S, SA, and SB mounted in vehicles will be taken as examples of the conveyance seats and configuration examples thereof will be described. However, the present invention is not limited to the vehicle seat S mounted in a wheeled ground conveyance such as automobiles and railway vehicles and can also be applied to, for example, seats mounted in non-ground conveyances such as aircraft and ships.

In addition, in the following description, "front to back direction" is the front to back direction of the vehicle seat S and coincides with the direction of travel of the vehicle that travels. In addition, "seat width direction" is the breadth direction of the vehicle seat S (that is, the width direction of the seat main body) and coincides with the right to left direction seen from occupants seated in the vehicle seats S, SA, and SB. In addition, "up to down direction" is the up to down direction of the vehicle seat S, which coincides with the vertical direction when the vehicle travels on a horizontal surface.

In addition, "outer side of the vehicle" in the seat width direction means the side that is closer to the outside of the body of the vehicle (to make it easier to understand, side close to the nearest door), and "inner side of the vehicle" means the side that is closer to the inside of the body of the vehicle (to make it easier to understand, side away from the nearest door).

In addition, unless otherwise specified, "pivoting" in the following description means pivoting about an axis along the seat width direction.

It should be noted that unless otherwise specified, the shape, position, posture, and so on of each portion of the vehicle seat described below are on the assumption that the vehicle seat S is in a seated state, which will be described later.

First Embodiment

<Vehicle Seat S>

Figure 1:
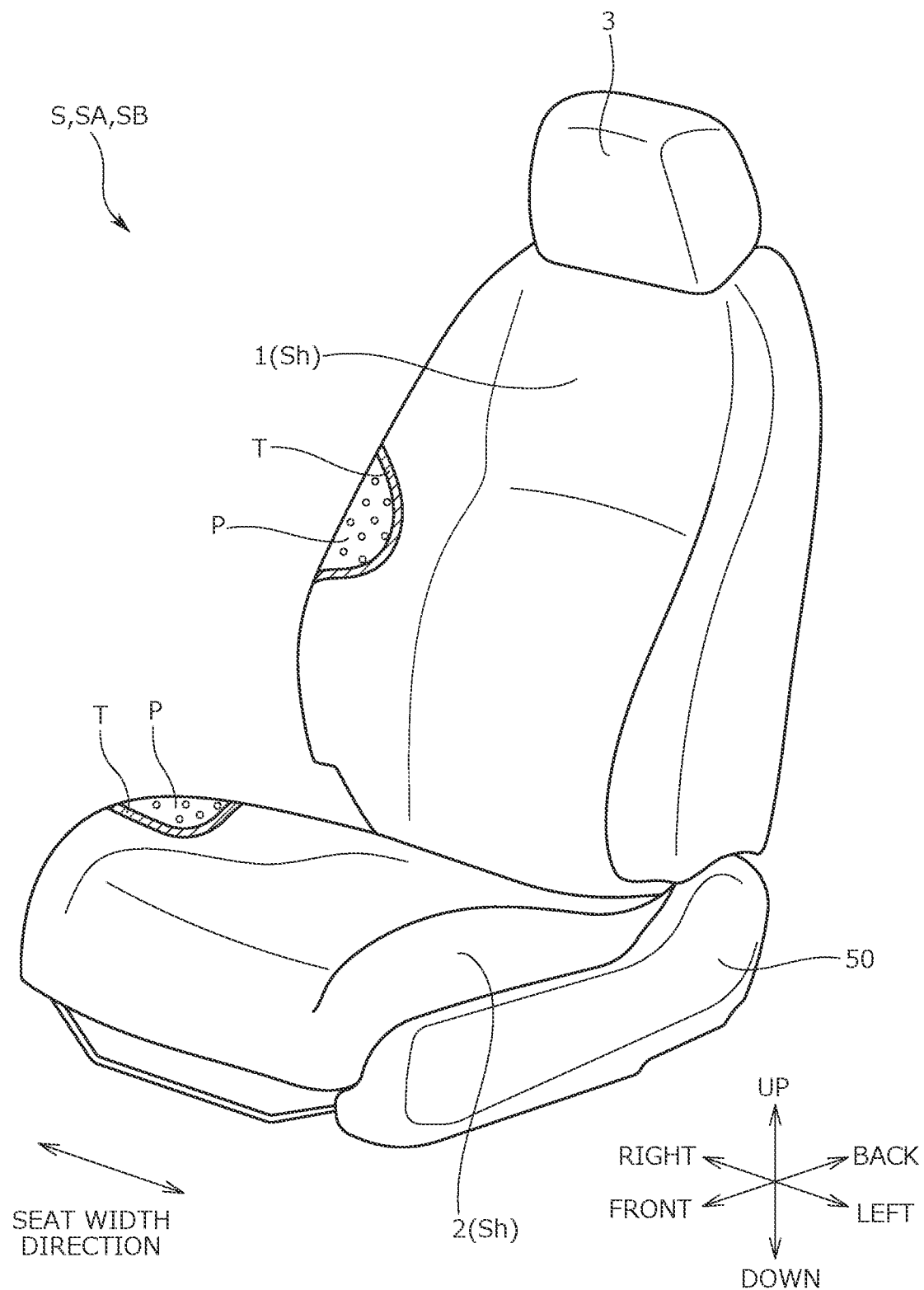
FIG. 1 is a perspective view illustrating the appearance of a vehicle seat according to a first embodiment of the present invention.

The basic configuration of the vehicle seat (hereinafter, the vehicle seat S) according to a first embodiment (hereinafter, the present embodiment) will be described with reference to FIG. 1. FIG. 1 is a perspective view of the vehicle seat S. Regarding a portion of the vehicle seat S in FIG. 1, the configuration is illustrated with a cushion trim cover T and a pad P removed for convenience of illustration.

The vehicle seat S, which is placed on the floor of the vehicle body, is a seat where a vehicle occupant sits. In the present embodiment, the vehicle seat S is used as a front seat corresponding to a front seat of a vehicle. However, the vehicle seat S is not limited thereto. The vehicle seat S can also be used as a rear seat and can also be used as a second-row middle seat or a third-row rear seat in a vehicle that has three rows of seats in the front to back direction.

As illustrated in FIG. 1, the main components of the vehicle seat S are a seat back 1 as a backrest part supporting the seated occupant's back, a seat cushion 2 as a seating part supporting the seated occupant's buttocks, and a headrest 3 arranged on the seat back 1 and supporting the seated occupant's head. The seat back 1 and the seat cushion 2 are connected so as to sandwich a reclining mechanism 7 (see FIG. 2). The seat back 1 is connected so as to be angle-adjustable by pivoting with respect to the seat cushion 2. The reclining mechanism 7 adjusts the inclination angle of the seat back 1. In addition, the seat back 1 and the seat cushion 2 will be collectively referred to as a seat main body Sh.

<Seat Frame F>

Figure 2:
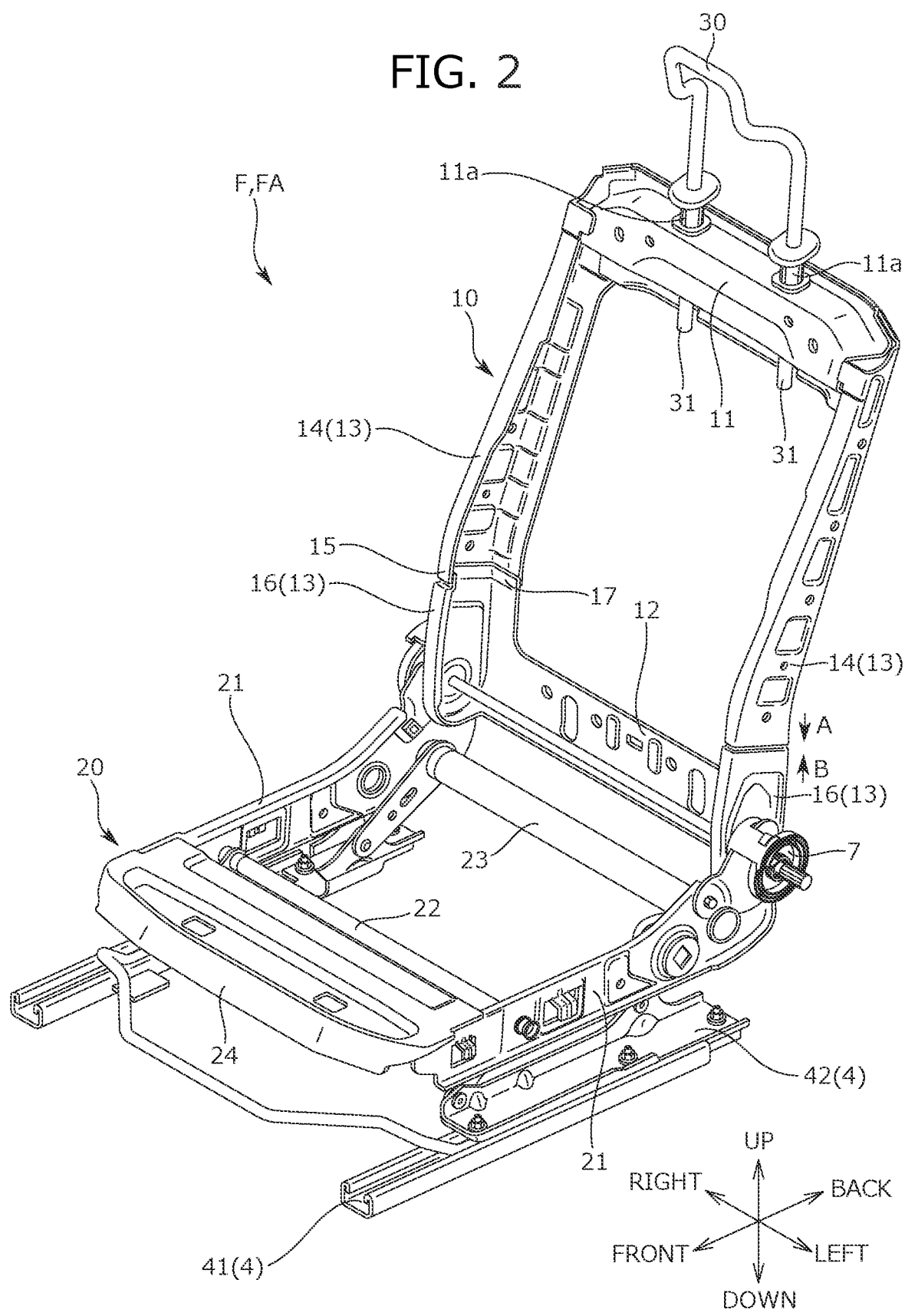
FIG. 2 is a perspective view illustrating a seat frame of the vehicle seat.

As illustrated in FIG. 2, a seat frame F is provided in the vehicle seat S. The seat frame F is configured from a seat back frame 10 forming the skeleton of the seat back 1 and a seat cushion frame 20 forming the skeleton of the seat cushion 2.

In the following description, configurations other than the seat back frame 10, such as the seat cushion frame 20, will be described first, and the seat back frame 10 will be subsequently described in detail.

<Seat Cushion Frame 20>

The seat cushion frame 20 is formed in a square frame shape and has side portions provided with a pair of cushion side frames 21 and 21. In addition, the seat cushion frame 20 has a front connecting frame 22 connecting the pair of cushion side frames 21 and 21 in the front and a rear connecting frame 23 connecting the pair of cushion side frames 21 and 21 in the rear. The front connecting frame 22 and the rear connecting frame 23 in the front and rear of the vehicle seat S are configured by round pipes. In addition, a cushion pan frame 24 is provided in front of the front connecting frame 22. It should be noted that although not illustrated, a pressure receiving member is attached to bridge the cushion pan frame 24 and the rear connecting frame 23 and the pressure receiving member supports the seated occupant's buttocks from below.

<Headrest 3 and Headrest Frame 30>

The headrest 3 is attached to the upper portion of the seat back 1 so as to support the seated occupant's head. A headrest frame 30 forming the skeleton of the headrest 3 as illustrated in FIG. 2 is provided in the headrest 3. Two headrest pillars 31 (also called headrest stays) hanging down from the lower portion of the headrest 3 are provided at both right and left ends of the headrest frame 30. The headrest 3 is attached to the seat back frame 10 by the headrest pillars 31 being inserted through headrest guides 11a attached to an upper frame 11 of the seat back frame 10, which will be described later.

<Pad P and Cushion Trim Cover T>

The pad P and the cushion trim cover T (cushion cover) are provided outside the seat back frame 10, the seat cushion frame 20, and the headrest frame 30 to configure the seat back 1, the seat cushion 2, and the headrest 3. The pad P is a urethane base material molded by foam molding using, for example, a urethane foam material, and the cushion trim cover T is made of a skin material such as cloth, synthetic leather, and genuine leather.

<Slide Rail 4>

In addition, a slide rail 4 is installed below the vehicle seat S as illustrated in FIG. 2. By this slide rail 4, the vehicle seat S is attached to the vehicle body floor in a state of being slidable in the front to back direction.

The slide rail 4 is a device for sliding the vehicle seat S along the front to back direction and has a known structure (structure of a general slide rail mechanism). The slide rail 4 has a lower rail 41 fixed on the vehicle body floor and an upper rail 42 slidable with respect to the lower rail 41. The upper rail 42 is slidable with respect to the lower rail 41 fixed to the vehicle body.

<Reclining Mechanism 7>

The reclining mechanism 7 is provided between the lower end portion of the seat back 1 and the rear end portion of the seat cushion 2. More specifically, the reclining mechanism 7 connects the seat back frame 10 of the seat back 1 and the seat cushion frame 20 of the seat cushion 2. The reclining mechanism 7 is capable of adjusting the angle of the seat back 1 (seat back frame 10) with respect to the seat cushion 2 (seat cushion frame 20). By the reclining mechanism 7, the seat back 1 can be locked at a predetermined angle and maintained in an inclined state. In addition, the seat back 1 can be laid down forward or backward by releasing the lock.

<Seat Back Frame 10>

The seat back frame 10 of the vehicle seat S of the present embodiment, back side frames 13 in particular, will be described below with reference to FIGS. 2 to 9.

As illustrated in FIG. 2, the seat back frame 10 is formed in a square frame shape as a whole and includes the upper frame 11, a lower frame 12, and the pair of back side frames 13 and 13 (a pair of side frames). The pair of back side frames 13 and 13 are disposed so as to be separated in the seat width direction (right to left direction). The upper frame 11 is disposed between the pair of back side frames 13 and 13 and connects the upper ends of the back side frames 13 and 13. The lower frame 12 is disposed between the pair of back side frames 13 and 13 and connects the lower ends of the pair of back side frames 13 and 13.

Each of the pair of back side frames 13 and 13 is divided in the longitudinal direction thereof (arrow A and B directions in FIG. 2) and is configured from a first member 14 positioned on the upper side and a second member 16 positioned on the lower side. Although each of the pair of back side frames 13 and 13 is divided into two members in the present embodiment, this is an example and each of the back side frames 13 may be divided into three or more members. The pair of back side frames 13 and 13 have the same configuration, and thus the back side frame 13 disposed on the right side will be mainly described below without describing the back side frame 13 disposed on the left side.

<Back Side Frame 13>

Figure 3:
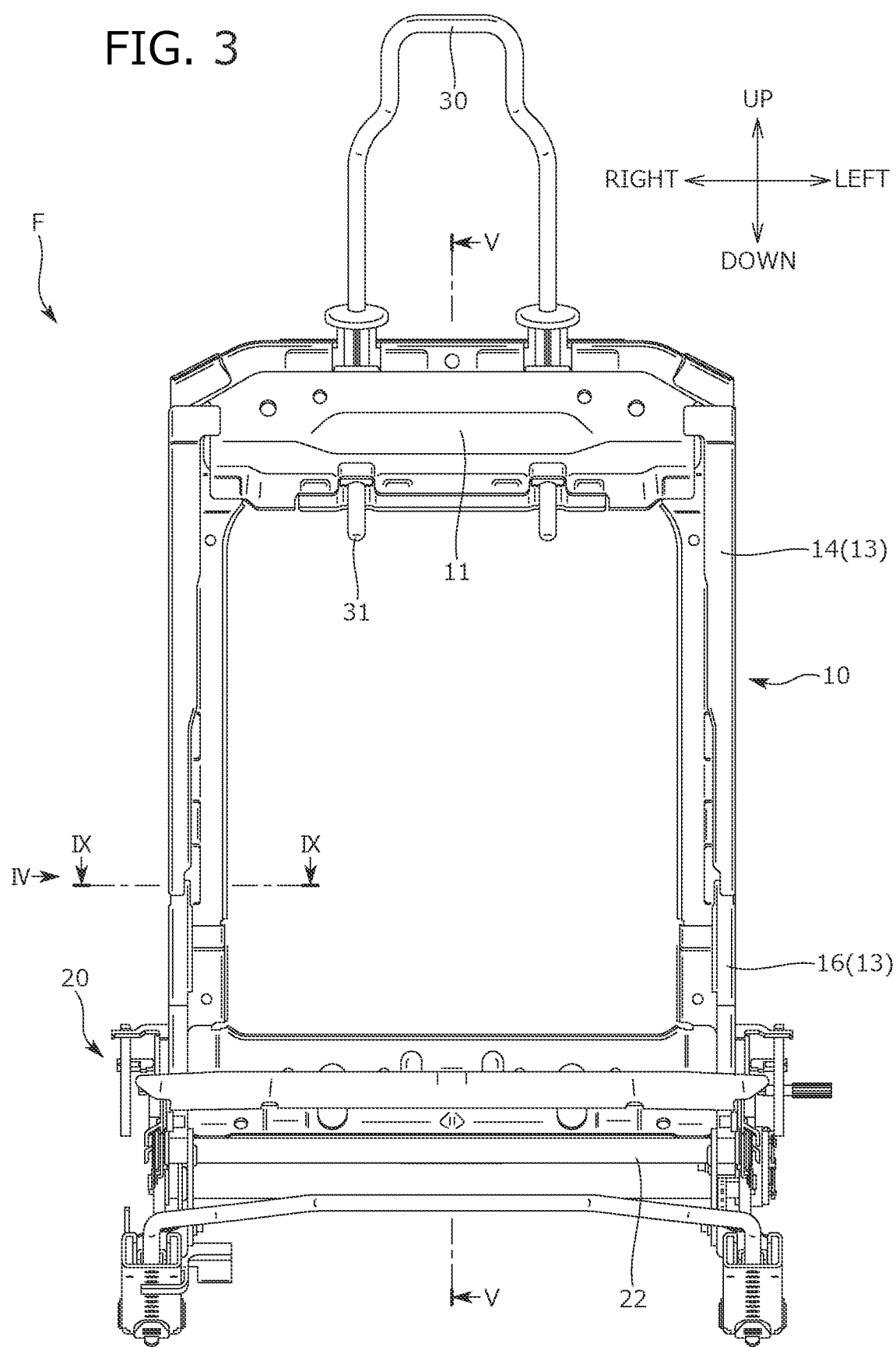
FIG. 3 is a front view illustrating the seat frame of the vehicle seat.
Figure 4:
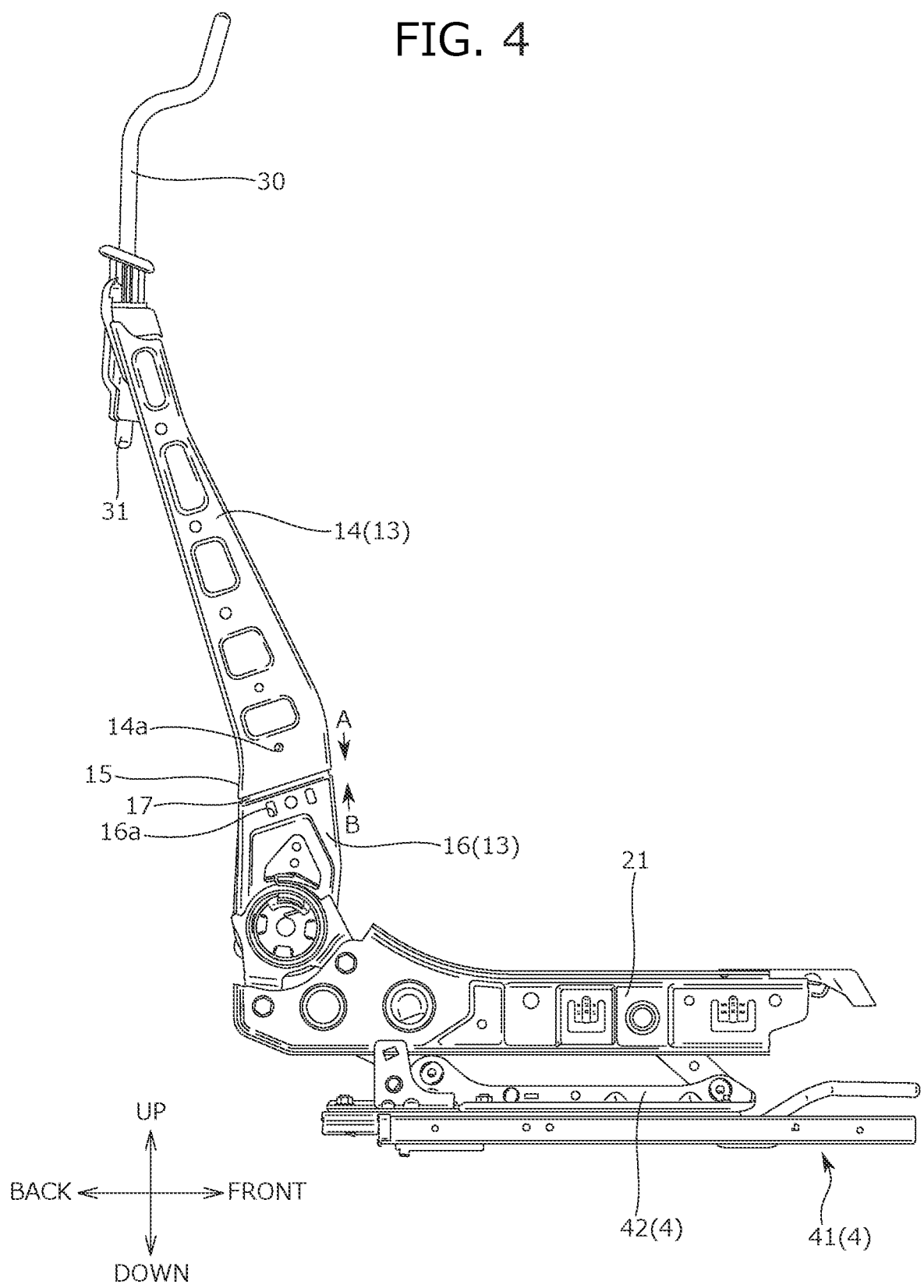
FIG. 4 is a side view illustrating the seat frame as seen from the arrow IV direction in FIG. 3.
Figure 5:
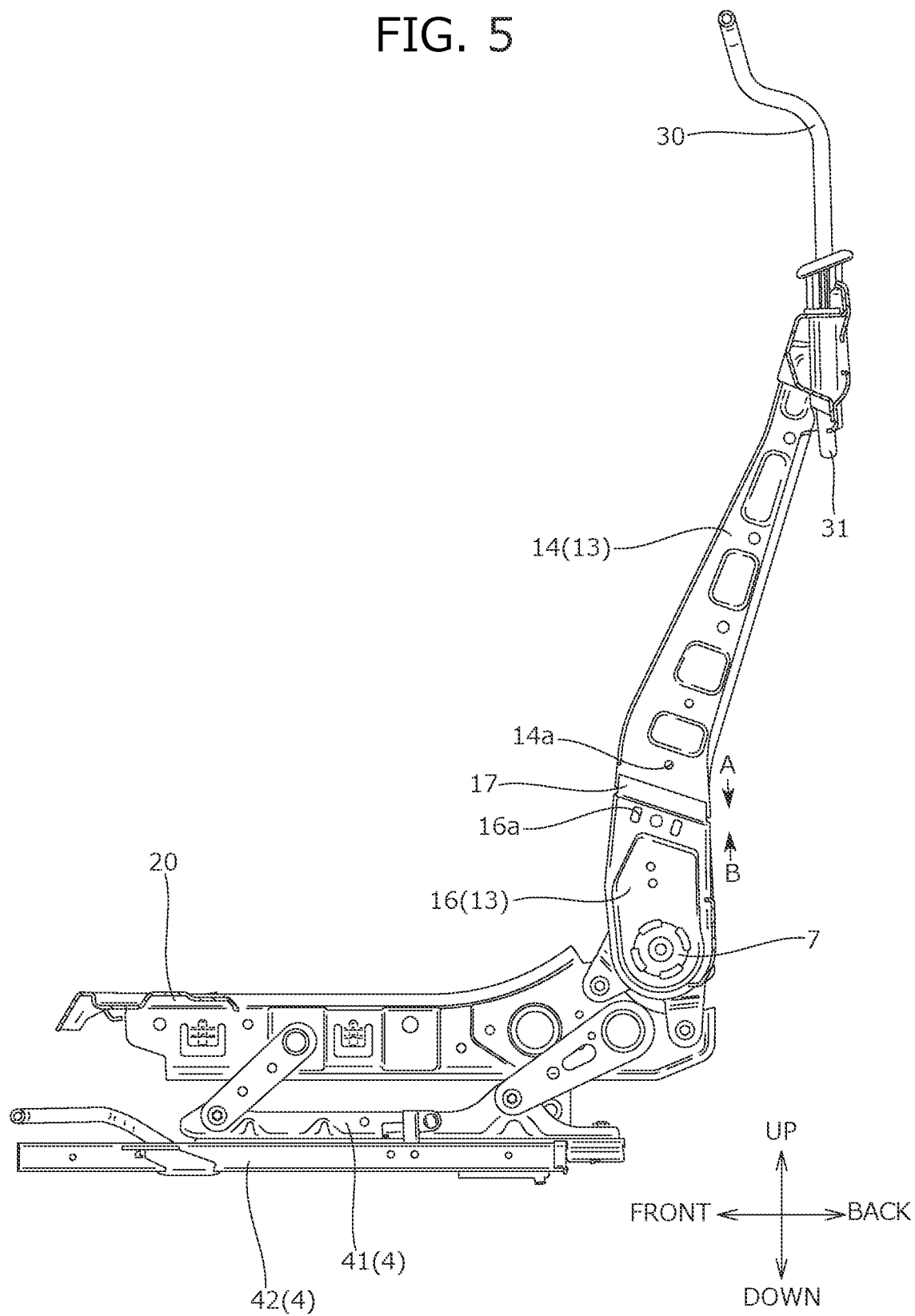
FIG. 5 is a cross-sectional view of the seat frame taken along line V-V in FIG. 3.

As illustrated in FIGS. 2 to 4, the first member 14 is positioned on the upper side of the back side frame 13, and the upper end of the first member 14 is connected to the right end portion of the upper frame 11.

The second member 16 is positioned in the lower portion of the back side frame 13, and the lower end of the second member 16 is connected to the right end portion of the lower frame 12.

The first member 14 and the second member 16 are connected so as to form the back side frame 13, the first member 14 has a first connecting portion 15 for connection to the second member 16, and the second member 16 has a second connecting portion 17 for connection to the first member 14.

The first connecting portion 15 and the second connecting portion 17 respectively have flat surface portions 15a and 17a extending in the longitudinal direction (arrow A and B directions). The flat surfaces of the flat surface portion 15a of the first connecting portion 15 and the flat surface portion 17a of the second connecting portion 17 are joined by welding in a state of facing and overlapping each other as illustrated in FIGS. 6 to 9. By joining the first connecting portion 15 and the second connecting portion 17, the first member 14 and the second member 16 are connected to form the back side frame 13.

<Welding Method>

The first connecting portion 15 and the second connecting portion 17 are connected by, for example, laser lap welding or MIG end welding. Since the flat surfaces can be welded in a state of facing and overlapping each other, it is also possible to perform joining by fusion welding such as arc welding, laser welding, and electron beam welding as well as butt welding and joining by pressure contact such as resistance welding.

<Regarding Plate Thickness and Material Type>

The first member 14 and the second member 16 are made of iron and formed by pressing a steel plate. Since the first member 14 and the second member 16 are made of iron, the back side frame 13 has sufficient strength. The first member 14 and the second member 16 are not limited to being made of iron and may be formed of, for example, a high-tensile steel material. The high-tensile steel material is thin but has tension. Therefore, the high-tensile steel material can be smaller in plate thickness than a steel plate, and thus it is possible to achieve weight reduction while ensuring rigidity.

The first member 14 and the second member 16 may be formed to differ from each other in material type. For example, the first member 14 may be formed of a high-tensile steel material and the second member 16 may be made of iron.

In addition, the first member 14 and the second member 16 may be formed to differ from each other in plate thickness. For example, the plate thickness of the first member 14 may be smaller than the plate thickness of the second member 16 by the first member 14 being formed of a high-tensile steel material and the second member 16 being made of iron.

In addition, the first member 14 or the second member 16 may be made of a light alloy of aluminum or magnesium that is light in weight. By the first member 14 or the second member 16 being made of the light alloy, a decrease in weight can be achieved as compared with a case where the seat back frame 10 is made of iron. In addition, the first member 14 or the second member 16 may be formed of resin. By the first member 14 or the second member 16 being made of resin, a decrease in weight can be achieved as compared with a case where the first member 14 or the second member 16 is made of iron.

By the first member 14 and the second member 16 being formed to differ from each other in plate thickness or material type as described above, the back side frame 13 can be formed with appropriate weight or strength as necessary.

<First Connecting Portion 15 and Second Connecting Portion 17>

In addition, as can be seen from FIGS. 6 to 9, the second connecting portion 17 of the second member 16 is positioned inside the first connecting portion 15 of the first member 14.

By positioning the second connecting portion 17 inside the first connecting portion 15, contact occurs in a wider area than in the case of butt connection, and thus the strength of the connecting portion between the first member 14 and the second member 16 can be improved.

It should be noted that the configuration in which the second connecting portion 17 is positioned inside the first connecting portion 15 is an example and the first connecting portion 15 may be configured to be positioned inside the second connecting portion 17.

Figure 6:
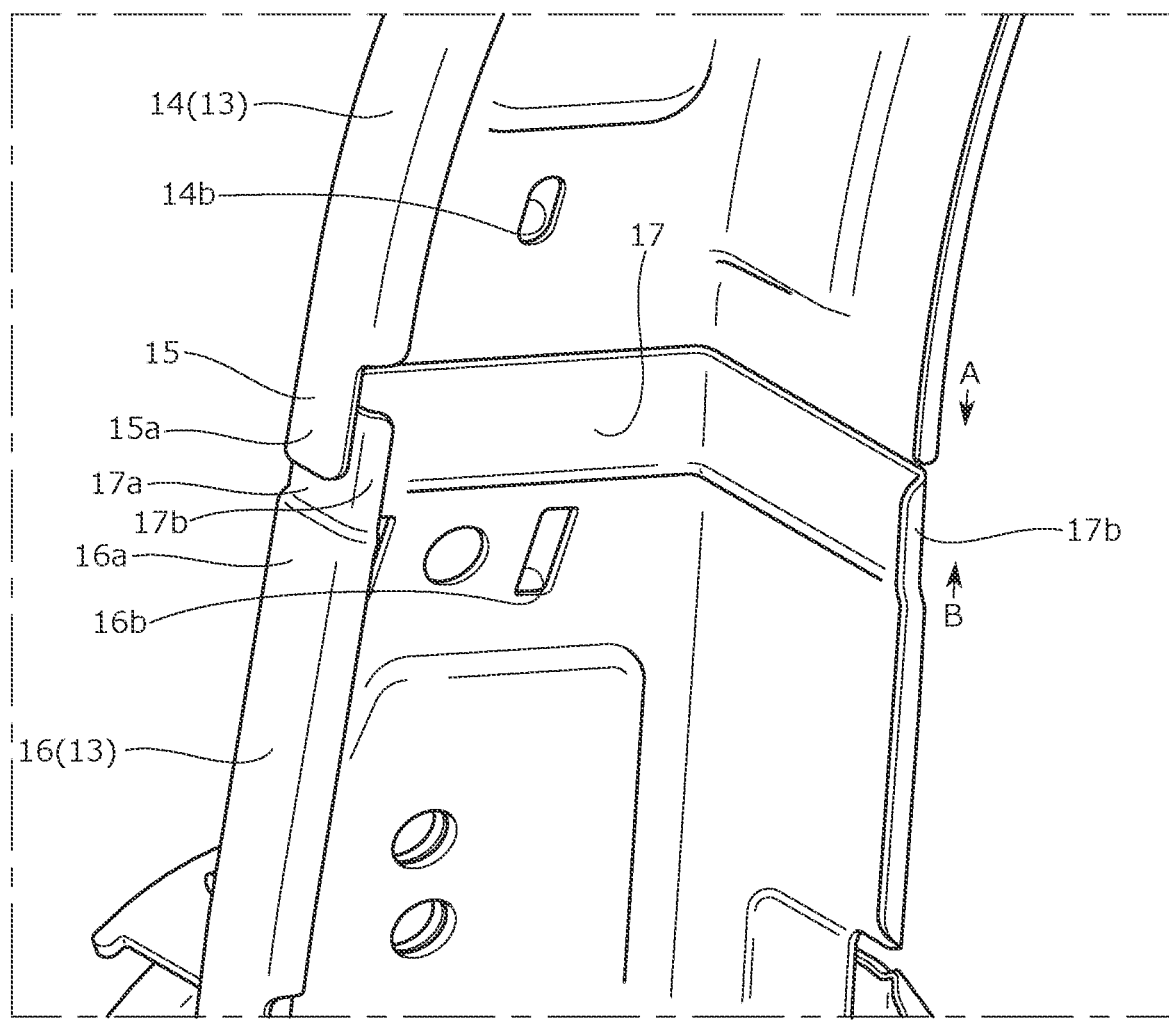
FIG. 6 is an enlarged perspective view in which a joining part of a side frame is seen obliquely from the front.
Figure 7:
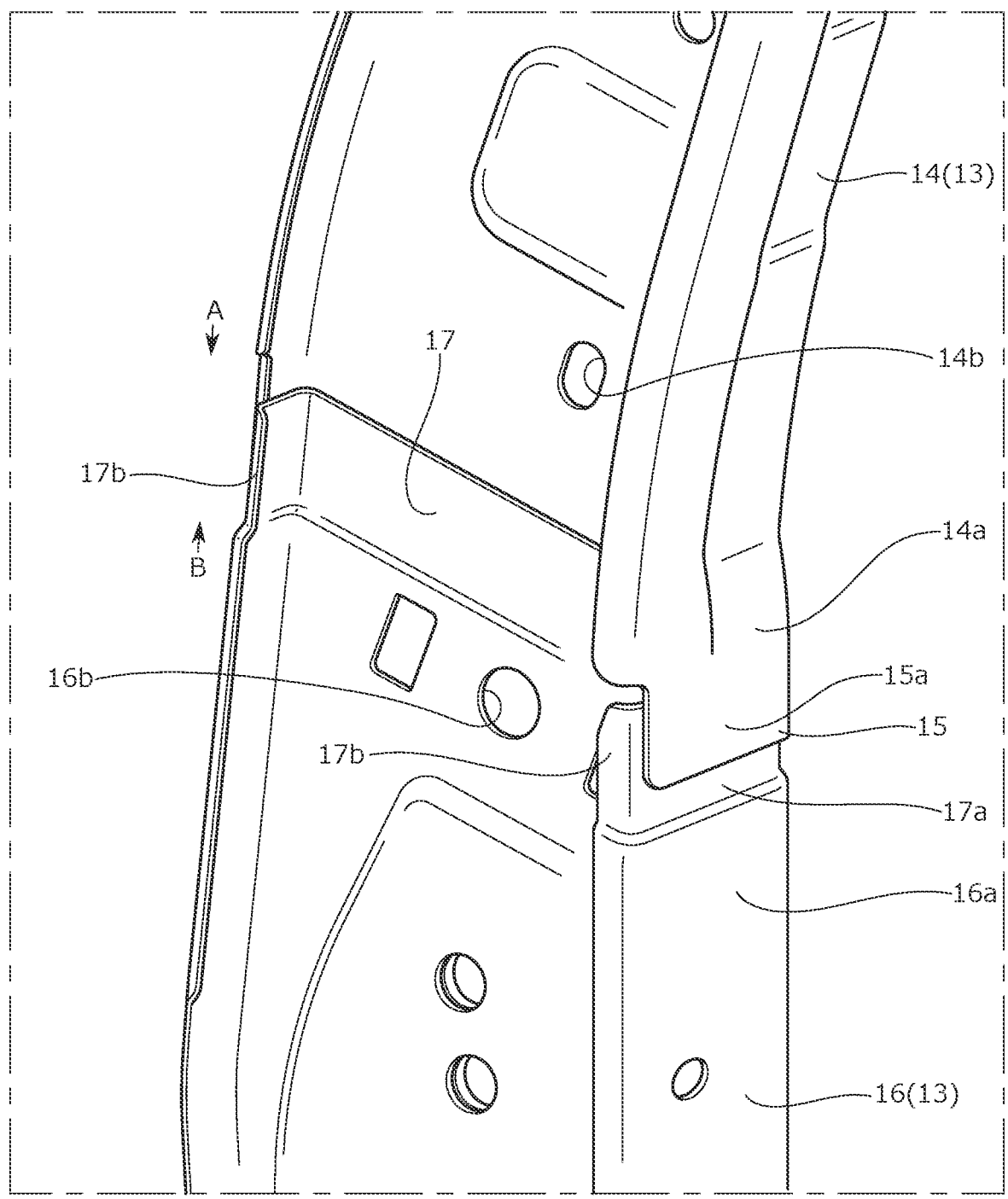
FIG. 7 is an enlarged perspective view in which the joining part of the side frame is seen obliquely from the rear.
Figure 8:
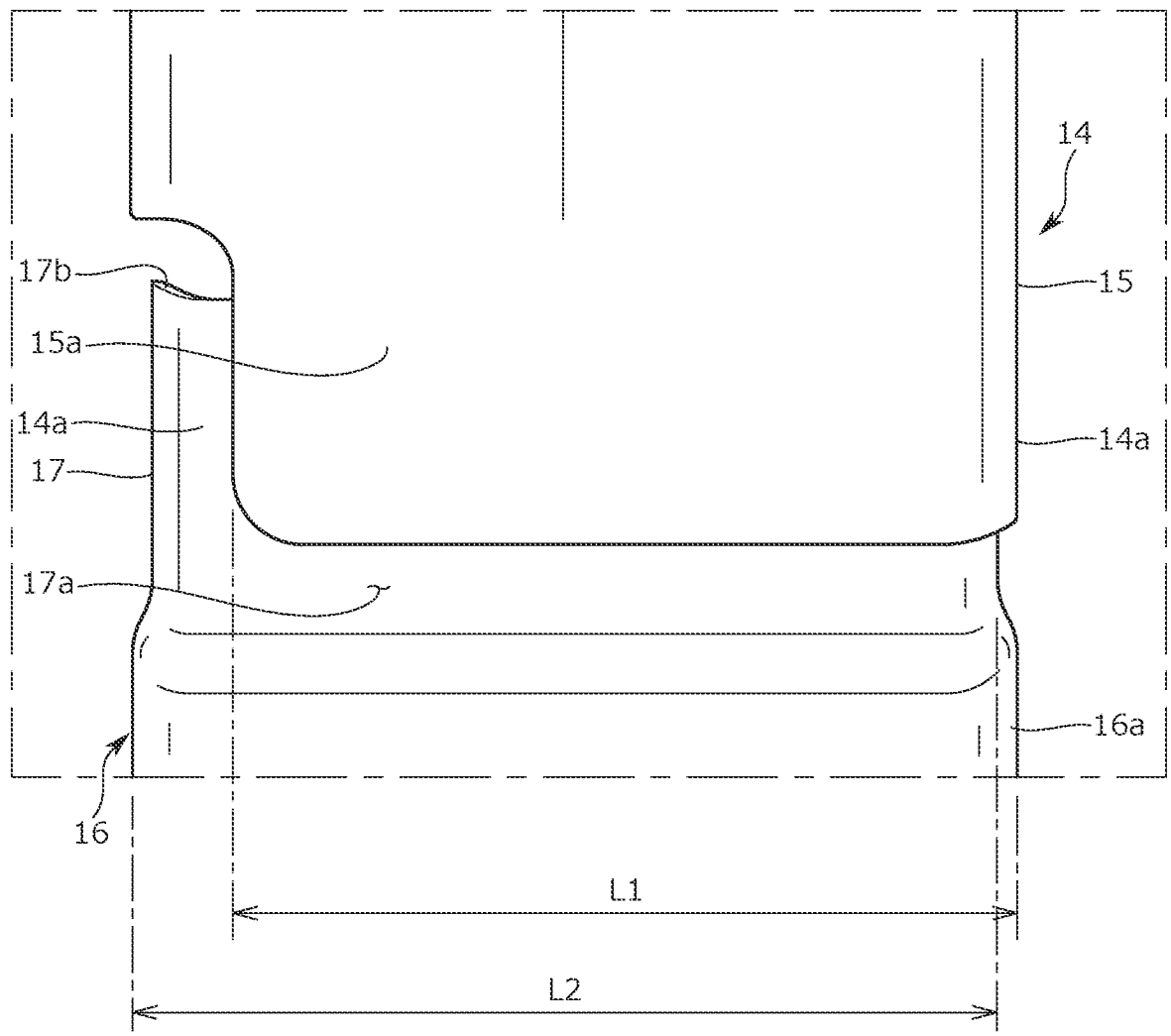
FIG. 8 is a rear view of the joining part of the side frame.

As illustrated in FIGS. 6 and 7, the second connecting portion 17 of the second member 16 is formed as a stepped portion and formed one size smaller than the first connecting portion 15 so as to be positioned inside the first connecting portion 15. Further, the first member 14 and the second member 16 are formed such that an outside surface 14a of the first member 14 and an outside surface 16a of the second member 16 are flush with each other as illustrated in FIG. 8 when the first member 14 and the second member 16 are connected.

By forming the second connecting portion 17 as a stepped portion, the back side frame 13 is made compact in size in the seat width direction and the front to back direction. In addition, positioning is facilitated during insertion into the first connecting portion 15. Assemblability is improved, and thus the manufacturing time of the vehicle seat S can be shortened and cost reduction can be achieved. In addition, designability is also improved by the outside surface 14a of the first member 14 and the outside surface 16a of the second member 16 being flush with each other.

It should be noted that the first connecting portion 15 may be formed as a stepped portion in a case where the first connecting portion 15 is inside the second connecting portion 17.

In addition, a flange 17b extending toward the inside of the second member 16 from the side portion of the second connecting portion 17 is formed as illustrated in FIGS. 6 to 9. The rigidity of the second connecting portion 17 is improved by forming the flange 17b. In addition, this flange 17b is not formed on the first connecting portion 15. By the first connecting portion 15 being flange-less, the first connecting portion 15 of the first member 14 can be, for example, not only inserted in the longitudinal direction (arrow A direction) but also moved in the seat width direction, that is, from the right side to the left side to overlap the second connecting portion 17 of the second member 16. As a result, the assemblability of the first member 14 and the second member 16 is improved.

It should be noted that a flange extending from the side portion of the first connecting portion 15 toward the inside of the first member 14 may be formed in a case where the first connecting portion 15 is configured to be positioned inside the second connecting portion 17. In this case, the second member 16 overlaps the first member 14 from the seat width direction by not forming a flange on the second connecting portion 17.

Figure 9:
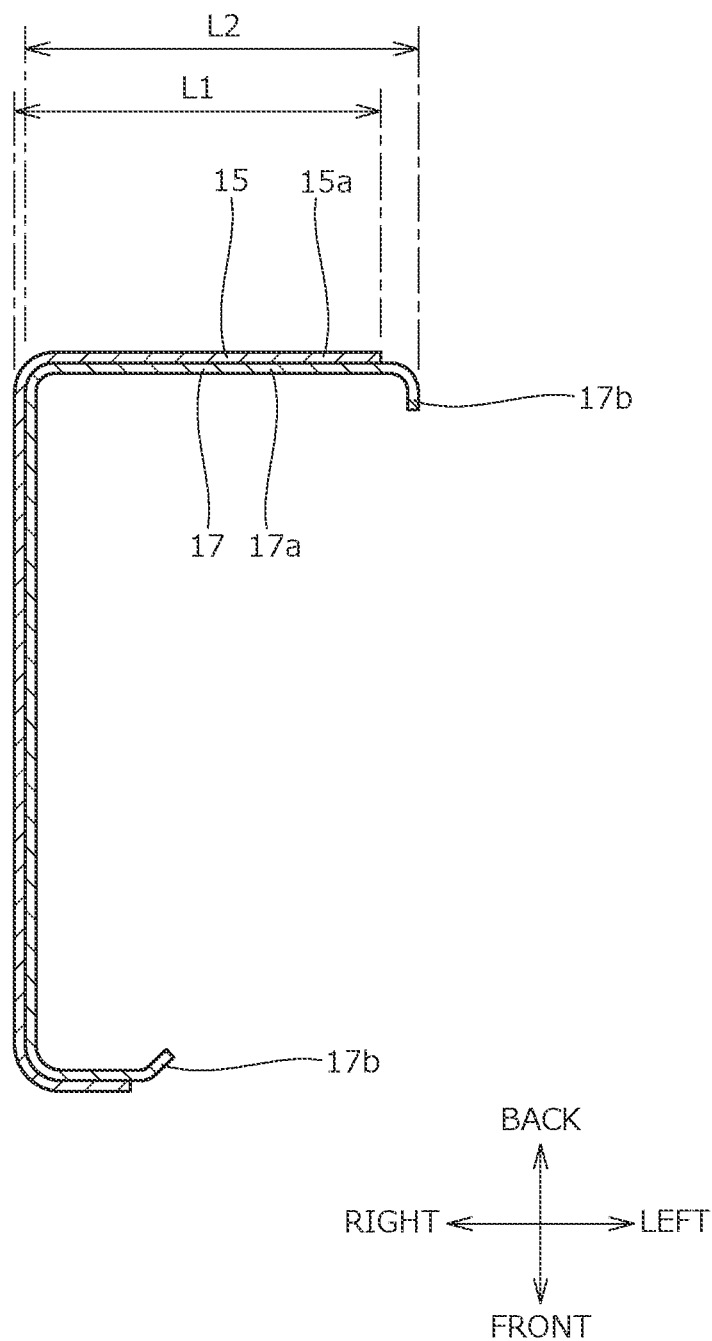
FIG. 9 is a cross-sectional view of the side frame taken along line IX-IX in FIG. 3.

In addition, as illustrated in FIGS. 8 and 9, a length L2 of the second connecting portion 17 in the seat width direction exceeds a length L1 of the first connecting portion 15 in the seat width direction. Welding is facilitated by the length L2 in the seat width direction of the second connecting portion 17 positioned inside the first connecting portion 15 exceeding the length L1 of the first connecting portion 15.

It should be noted that preferably, the length L1 of the first connecting portion 15 in the seat width direction is configured to exceed the length L2 of the second connecting portion 17 in the width direction in a case where the first connecting portion 15 is configured to be positioned inside the second connecting portion 17.

Further, as illustrated in FIGS. 6 and 7, the back side frame 13 is formed with a plurality of opening portions 14b and 16b, and harnesses or the like are passed through the plurality of opening portions 14b and 16b or the plurality of opening portions 14b and 16b are used as clip holes for harnesses or the like. These opening portions 14b and 16b are formed at positions avoiding the first connecting portion 15 and the second connecting portion 17 connecting the first member 14 and the second member 16. As a result, a decline in connection strength is suppressed.

The back side frame 13 of the present embodiment has been described above with reference to the drawings. Although the back side frame 13 is divided into two members in the present embodiment, this is an example and the cushion side frame 21 configuring the seat cushion frame 20 may be configured to be divided into a plurality of members. By dividing the cushion side frame 21 into a plurality of members, the cushion side frame 21 can be formed by combining different plate thicknesses or material types as in the case of the back side frame 13 and the cushion side frame 21 can be appropriate in terms of strength and weight.

Another Embodiment

Next, another embodiment will be described with reference to FIGS. 10 to 21, which relates to a conveyance seat that has a reclining cover provided on a seat cushion frame.

In the related art, a reclining cover that covers a reclining mechanism was attached to a vehicle seat by supporting a reinforcement wire frame extending along an end portion of the reclining cover with a bracket fixed to a cushion side frame. However, in this attachment structure, the bracket, the reinforcement wire frame, and so on are used in attaching the reclining cover, and thus an increase in the number of components and assembly process complexity arose as problems.

In addition, Japanese Utility Model Laid-Open No. 2-44534 (hereinafter, PATENT LITERATURE 2) discloses a structure for supporting a reclining cover (called a seat side garnish in PATENT LITERATURE 2) with a metal bracket bent in a crank shape.

Nowadays, a vehicle seat is equipped with an electric mechanism that automatically moves a seat cushion or a seat back using a motor or the like, and there has been a demand for disposing a switching unit or the like (functional component) for operating the electric mechanism in a reclining cover. However, in the support structure using the bracket disclosed in PATENT LITERATURE 2, it is difficult to dispose the switching unit or the like in the reclining cover.

Therefore, there is still a demand for a structure capable of supporting a reclining cover and receiving load input to the reclining cover in both cases where a vehicle is provided with an electric mechanism having a functional component such as a switching unit (power specification) and a vehicle is electric mechanism-less (manual specification).

The conveyance seat of the other embodiment has been made in view of the above problems, and an object thereof is to provide a conveyance seat that has a structure supporting a reclining cover and receiving load input to the reclining cover in both cases of having and not having an electric mechanism.

The above object is achieved by including: a seat cushion; a seat cushion frame forming a skeleton of the seat cushion and having a pair of cushion side frames; a reclining mechanism provided in a rear end portion of the seat cushion; a reclining cover covering an end portion of the reclining mechanism and a side portion of one of the pair of cushion side frames; and a base cover covering a functional component, attachable to the cushion side frame, fixing the reclining cover to the cushion side frame between the reclining cover and the cushion side frame, and supporting an input load to the reclining cover with the cushion side frame.

According to the conveyance seat described above, the reclining cover is fixed to the cushion side frame by the base cover covering the functional component and attachable to the cushion side frame, and the cushion side frame supports the input load to the reclining cover. Therefore, a component such as a reinforcement wire frame and a bracket can be eliminated and attachment can be facilitated. In addition, since the base cover fixing the reclining cover is used, it is possible to provide a conveyance seat that has a structure supporting a reclining cover and receiving load input to the reclining cover in both cases of having and not having an electric mechanism.

In addition, in the conveyance seat described above, the reclining cover may have a support portion where a groove portion is formed inside an upper portion, and the base cover may have a flange portion extending in a seat front to back direction in an upper portion and may be fixed to the cushion side frame by inserting the flange portion into the groove portion formed in the support portion of the reclining cover.

The position of the reclining cover can be stably regulated by inserting the flange portion extending in the front to back direction into the groove portion of the reclining cover.

In addition, in the conveyance seat described above, the base cover may have a crank-shaped cross section including the flange portion supporting the reclining cover and a fixed part attached to the cushion side frame.

The rigidity of the base cover is improved by the base cover having the crank-shaped cross section. In addition, a space is formed between the reclining cover and the base cover and, for example, a switching unit or the like as a functional component can be disposed in the space.

In addition, in the conveyance seat described above, the base cover may have a boss formed on an inner side surface, the cushion side frame may have a through hole formed at a position corresponding to the boss, and positions of the base cover in a front to back direction and an up to down direction with respect to the cushion side frame may be regulated by inserting the boss of the base cover through the through hole of the cushion side frame.

By inserting the boss through the through hole, the base cover can be easily assembled to the cushion side frame.

In addition, in the conveyance seat described above, the base cover may have a tapping fixing portion fixed by screwing with respect to the cushion side frame and an engaging claw portion fixed by claw portion engagement, and the tapping fixing portion and the engaging claw portion may be disposed so as to overlap in a front to back direction.

Since the tapping fixing portion and the engaging claw portion are disposed so as to overlap in the front to back direction, the base cover can be more firmly fixed to the cushion side frame.

In addition, in the conveyance seat described above, an inner cover may be provided between the base cover and the reclining cover, and the inner cover may be fixed to an outer side surface of the base cover.

Since the inner cover is fixed to the outer side surface of the base cover, the rigidity of the base cover is improved and load input can be received more stably.

In addition, in the conveyance seat described above, the base cover and the inner cover may be engaged by a resin claw.

Since the base cover and the inner cover are engaged by the resin claw, the structure is simple and assembly is facilitated.

In addition, the conveyance seat described above may include a switching unit as the functional component, and the switching unit may be disposed between the inner cover and the reclining cover and fixed to the inner cover.

Since the switching unit is fixed to the inner cover, the switching unit is protected against load input from the outside.

In addition, in the conveyance seat described above, the switching unit may be positioned inside the base cover in side view and may be disposed so as to overlap a fixed position where the base cover is fixed to the cushion side frame.

Since the switching unit is positioned inside the base cover and disposed so as to overlap the fixed position of the base cover, the switching unit is further protected against load input from the outside.

In addition, in the conveyance seat described above, the reclining cover may be fixed by hooking a fixing claw provided in a front end portion of the reclining cover on the base cover.

Since the fixing claw provided in the front end portion of the reclining cover is hooked on the base cover, position regulation on the front side of the reclining cover can be ensured.

According to the conveyance seat of the other embodiment, the reclining cover is fixed to the cushion side frame by the base cover covering the functional component and attachable to the cushion side frame, and the cushion side frame supports the input load to the reclining cover. Therefore, a component such as a reinforcement wire frame and a bracket can be eliminated and attachment can be facilitated. In addition, since the base cover fixing the reclining cover is used, it is possible to provide a conveyance seat that has a structure supporting a reclining cover and receiving load input to the reclining cover in both cases of having and not having an electric mechanism.

In addition, the position of the reclining cover can be stably regulated by inserting the flange portion extending in the front to back direction into the groove portion of the reclining cover.

The rigidity of the base cover is improved by the base cover having the crank-shaped cross section. In addition, a space is formed between the reclining cover and the base cover and, for example, a switching unit or the like can be disposed in the space.

In addition, by inserting the boss through the through hole, the base cover can be easily assembled to the cushion side frame.

In addition, since the tapping fixing portion and the engaging claw portion are disposed so as to overlap in the front to back direction, the base cover can be more firmly fixed to the cushion side frame.

In addition, since the inner cover is fixed to the outer side surface of the base cover, the rigidity of the base cover is improved and load input can be received more stably.

In addition, since the base cover and the inner cover are engaged by the resin claw, the structure is simple and assembly is facilitated.

In addition, since the switching unit is fixed to the inner cover, the switching unit is protected against load input from the outside.

In addition, since the switching unit is positioned inside the base cover and disposed so as to overlap the fixed position of the base cover, the switching unit is further protected against load input from the outside.

In addition, since the fixing claw provided in the front end portion of the reclining cover is hooked on the base cover, position regulation on the front side of the reclining cover can be ensured.

Second Embodiment

Hereinafter, the vehicle seat SA according to a second embodiment (hereinafter, the present embodiment), which is one of other embodiments, will be described with reference to FIGS. 1 and 10 to 14. The basic configuration of the vehicle seat SA according to the present embodiment is the same as the basic configuration of the vehicle seat S according to the first embodiment. Therefore, detailed description of the same parts will be omitted. Parts different from the vehicle seat S of the first embodiment will be mainly described below.

<Vehicle Seat SA>

As in the case of the vehicle seat S illustrated in FIG. 1, the main components of the vehicle seat SA are the seat back 1 as a backrest part supporting the back of a seated occupant who is an occupant, the seat cushion 2 as a seating part supporting the seated occupant's buttocks, and the headrest 3 arranged on the seat back 1 and supporting the seated occupant's head. The seat back 1 and the seat cushion 2 are connected so as to sandwich the reclining mechanism 7 (see FIG. 2). The seat back 1 is connected so as to be angle-adjustable by pivoting with respect to the seat cushion 2. The reclining mechanism 7 is a mechanism adjusting the inclination angle of the seat back 1. In addition, the seat back 1 and the seat cushion 2 may be collectively referred to as the seat main body Sh.

<Seat Frame FA>

A seat frame FA is provided in the vehicle seat SA as illustrated in FIG. 2. The seat frame FA is configured from the seat back frame 10 forming the skeleton of the seat back 1 and the seat cushion frame 20 forming the skeleton of the seat cushion 2.

The configurations of the seat back frame 10 and the seat cushion frame 20 are the same as those of the vehicle seat S, and thus detailed description thereof will be omitted. In addition, the headrest 3, the headrest frame 30, the pad P, the cushion trim cover T, the slide rail 4, and the reclining mechanism 7 are the same as those of the vehicle seat S, and thus detailed description thereof will be omitted.

<Reclining Cover and Base Cover>

Hereinafter, a reclining cover 50 and a base cover 60 of the vehicle seat SA of the present embodiment will be described with reference to FIGS. 1 and 10 to 14.

Figure 10:
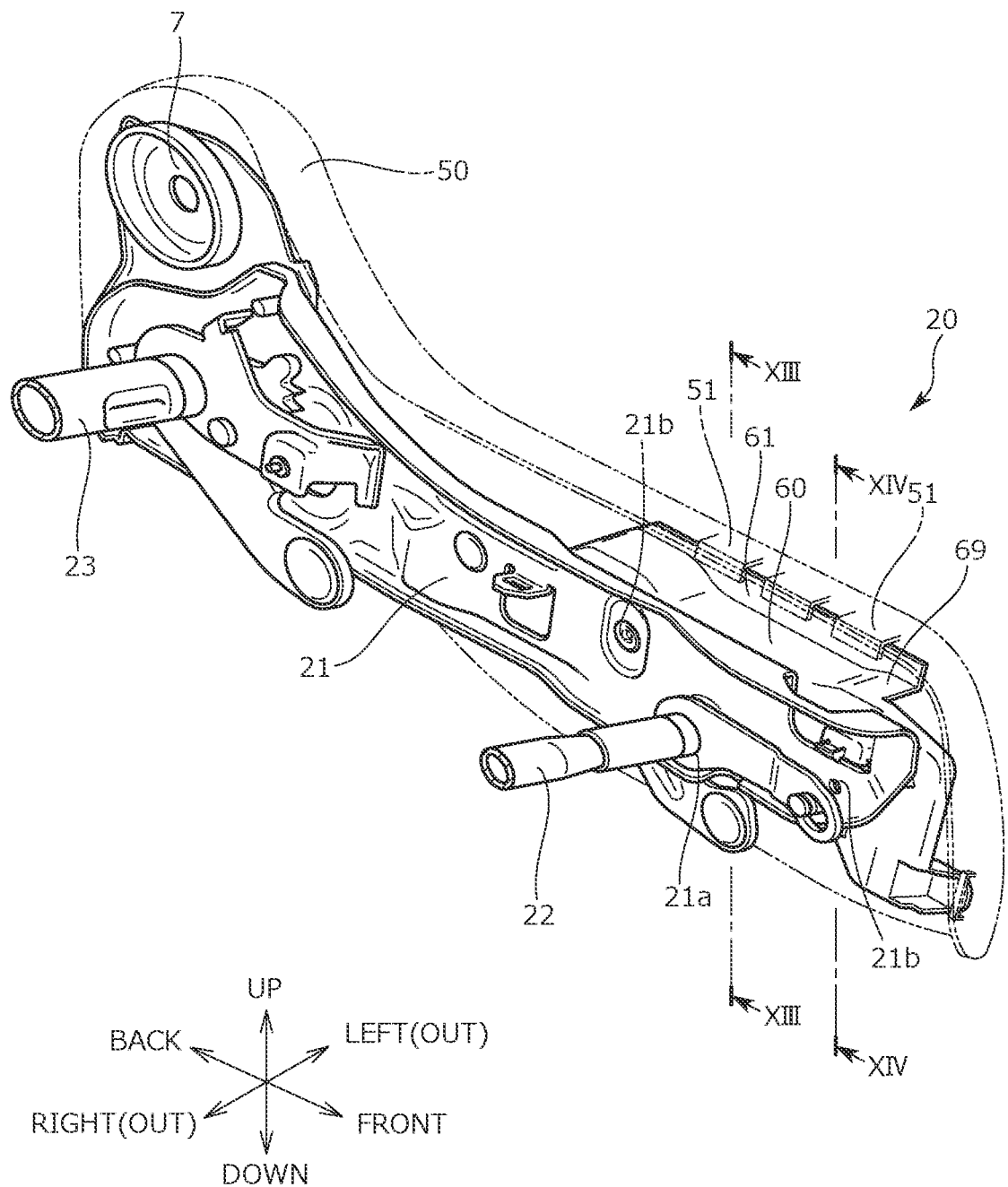
FIG. 10 is a perspective view in which a cushion side frame to which a reclining cover is attached is seen from the inside of the vehicle seat.

The reclining cover 50 is a member covering the end portion of the reclining mechanism 7 and the side portion of the cushion side frame 21 as illustrated in FIGS. 1 and 10. By attaching the reclining cover 50, the reclining mechanism 7 and the cushion side frame 21 are protected without being exposed to the outside.

In the related art, a reclining cover is attached by a bracket being attached to the cushion side frame 21 and the bracket supporting a reinforcement wire frame provided along the upper edge of the reclining cover. However, since the bracket, the reinforcement wire frame, and so on are used in order to fix the reclining cover, the number of components increases and work for assembly thereof is required.

In the present embodiment, as illustrated in FIG. 10, the reclining cover 50 is attached with respect to the left cushion side frame 21, which is one of the pair of cushion side frames 21. The rear end portion of the reclining cover 50 is fixed by a resin claw or the like provided around the reclining mechanism 7. Meanwhile, the front part of the reclining cover 50 is fixed by the base cover 60 provided between the reclining cover 50 and the cushion side frame 21. It should be noted that the reclining cover 50 may be fixed to the right cushion side frame 21.

The base cover 60 is a member capable of covering a functional component such as a switching unit and attaching the functional component to the cushion side frame 21. The base cover 60 further has a function for fixing the reclining cover 50 and the function of supporting an input load to the reclining cover 50 with the cushion side frame 21.

Since the reclining cover 50 is supported by the base cover 60, a bracket, a reinforcement wire frame, and so on are unnecessary unlike in the related art, the number of components can be reduced, and assembly can be expedited.

As illustrated in FIGS. 10, 11, and 13, a plurality of ribs 51 (support portions) are provided inside the upper portion of the reclining cover 50, and a groove portion 52 is formed below the ribs 51. The upper portion of the base cover 60 is provided with a flange portion 61 extending in the seat front to back direction, and the flange portion 61 is inserted into the groove portion 52 formed below the rib 51 as illustrated in FIG. 6. By inserting the flange portion 61 extending in the seat front to back direction into the groove portion 52 formed by the plurality of ribs 51, the reclining cover 50 can be supported in a wide range and the position can be regulated more stably.

In addition, as illustrated in FIG. 13, the base cover 60 has a crank-shaped (S-shaped) cross section including the flange portion 61 supporting the reclining cover 50 and a fixed part 62 attached to the cushion side frame 21. By forming the base cover 60 in a crank shape, the rigidity of the base cover 60 is improved and, as illustrated in FIG. 13, a space SP is formed between the reclining cover 50 and the fixed part 62. A functional component such as a switching unit can be disposed in this space SP. It should be noted that in a case where no functional components are attached to the vehicle seat SA, such as a manual specification without switching units for electric mechanism operation, nothing may be attached to the base cover 60 and the space SP between the reclining cover 50 and the base cover 60 may be empty.

In addition, as illustrated in FIG. 11, a boss 63 for position fixing is formed on an inner side surface 62a of the fixed part 62 of the base cover 60. The boss 63 is provided so as to protrude toward the inside of the vehicle seat SA. In addition, in the side surface of the cushion side frame 21, a through hole 21a is formed at a position corresponding to the boss 63, a position connected to the front connecting frame 22 to be specific. The base cover 60 is attached to the cushion side frame 21 by the boss 63 being inserted through the through hole 21a. By the boss 63 being inserted through the through hole 21a, the positions of the base cover 60 in the front to back direction and the up to down direction are regulated. As a result, the base cover 60 can be easily assembled to the cushion side frame 21.

In addition, as illustrated in FIG. 11, the base cover 60 is provided with two tapping fixing portions 64 for fixing by screwing with respect to the cushion side frame 21. The tapping fixing portion 64 protrudes toward the inside and is positioned so as to communicate with a through hole 21b formed in the cushion side frame 21.

In addition, the base cover 60 is provided with two engaging claw portions 65 engaging with the cushion side frame 21. The two engaging claw portions 65 are disposed above and below the tapping fixing portion 64, that is, at positions overlapping the tapping fixing portion 64 in the front to back direction. In other words, the tapping fixing portion 64 is disposed so as to be sandwiched between the two engaging claw portions 65. By the tapping fixing portion 64 and the engaging claw portion 65 being disposed in this manner and screwed, the base cover 60 can be more firmly fixed to the cushion side frame 21.

It should be noted that an abutting protrusion 66 (boss) abutting against the side portion of the cushion side frame 21 is provided in front of the tapping fixing portion 64 to support the base cover 60.

In addition, as illustrated in FIG. 11, the reclining cover 50 has a fixing claw 53 in the front end portion thereof, and the reclining cover 50 is fixed by hooking the fixing claw 53 at the tip of the base cover 60. By the fixing claw 53 in the front end portion of the reclining cover 50, position regulation on the front side of the reclining cover 50 can be ensured.

Figure 12:
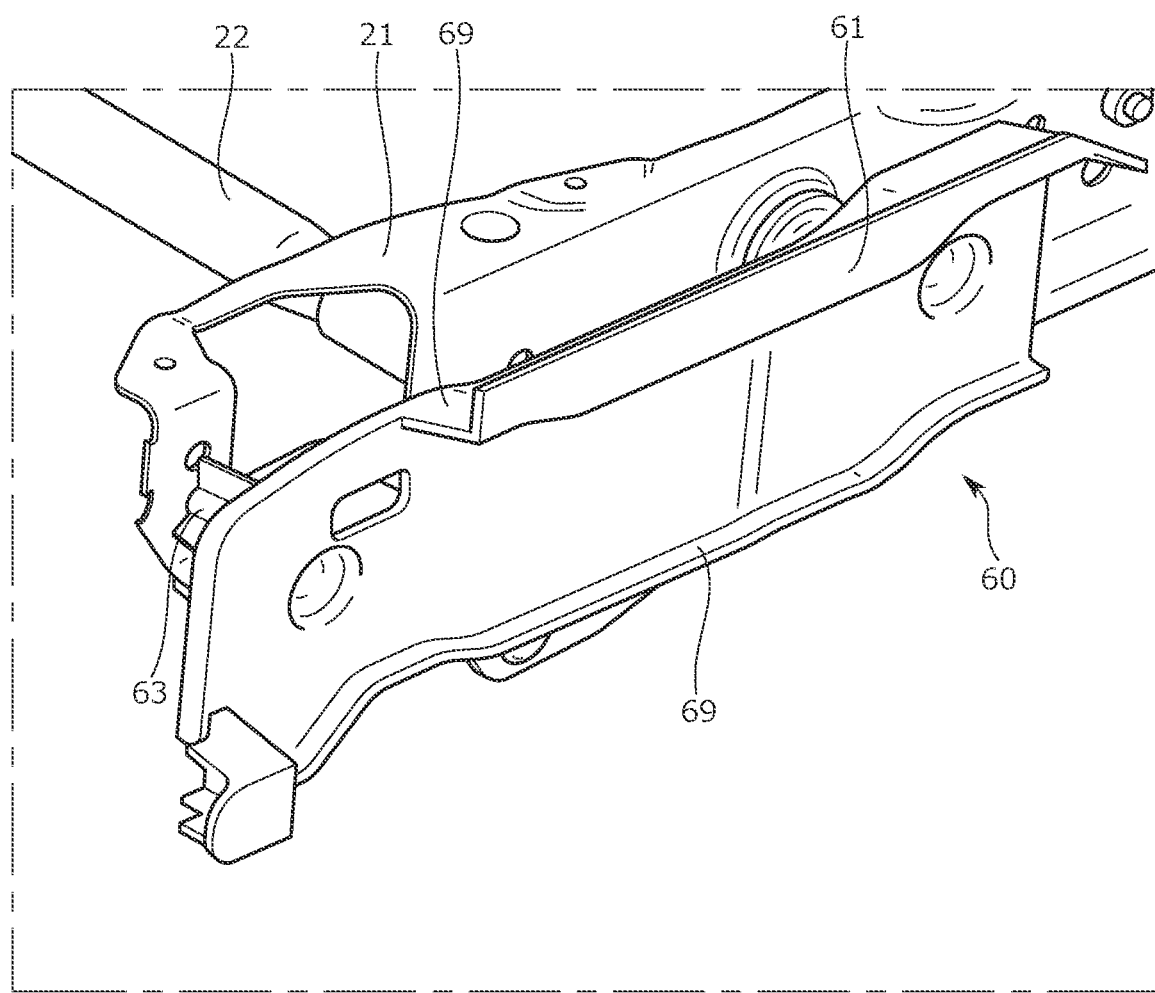
FIG. 12 is a perspective view in which the base cover is seen from the outside of the vehicle seat.
Figure 14:
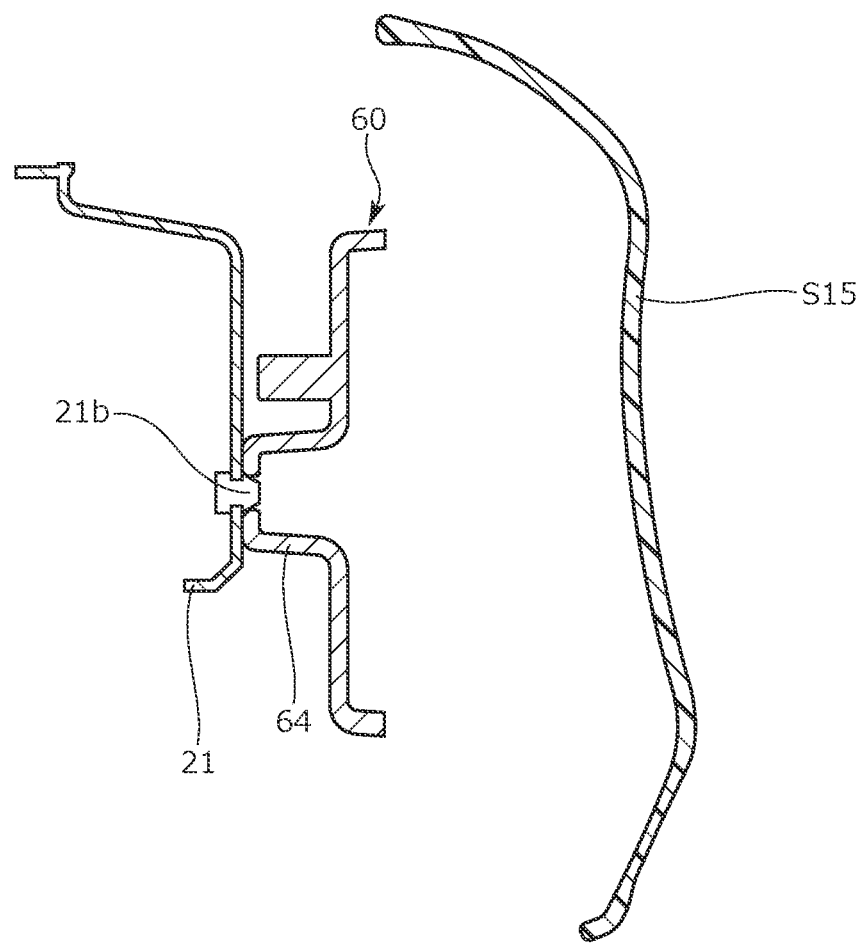
FIG. 14 is a cross-sectional view taken along line XIV-XIV in FIG. 10.

As illustrated in FIG. 12, the base cover 60 is provided with a wall portion 69 extending to the outside around the fixed part 62 and is formed so as to have a box shape as a whole. With the box shape, it is possible to, for example, cover a unit cover 80 (inner cover), which will be described later.

Third Embodiment

<Vehicle Seat SB Having Electric Mechanism>

Next, the vehicle seat SB of a third embodiment, which is another embodiment, will be described with reference to FIGS. 15 to 21. The vehicle seat SB differs from the vehicle seat SA in that the vehicle seat SB has an electric mechanism. As in the case of the vehicle seat SA illustrated in FIG. 1, the vehicle seat SB includes the seat back 1, the seat cushion 2, and the headrest 3. In addition, the reclining mechanism 7 is provided between the seat back 1 and the seat cushion 2.

The vehicle seat SA illustrated in FIGS. 10 to 14 is a manual specification for manually performing, for example, a change in the height of the seat cushion 2 or reclining to change the tilt of the seat back 1. On the other hand, the vehicle seat SB illustrated in FIGS. 15 to 21 is a power specification in which the seat main body Sh is equipped with an electric mechanism such as an actuator 90 to automatically change the height or reclining angle of the seat cushion 2.

The vehicle seat SB has substantially the same configuration as the vehicle seat SA illustrated in FIGS. 10 to 14 except that the cushion side frame 21 of a seat cushion frame 20A is provided with the actuator 90, a switching unit 70, and so on, and thus detailed description of the seat back 1, the seat cushion 2, and so on will be omitted.

Figure 15:
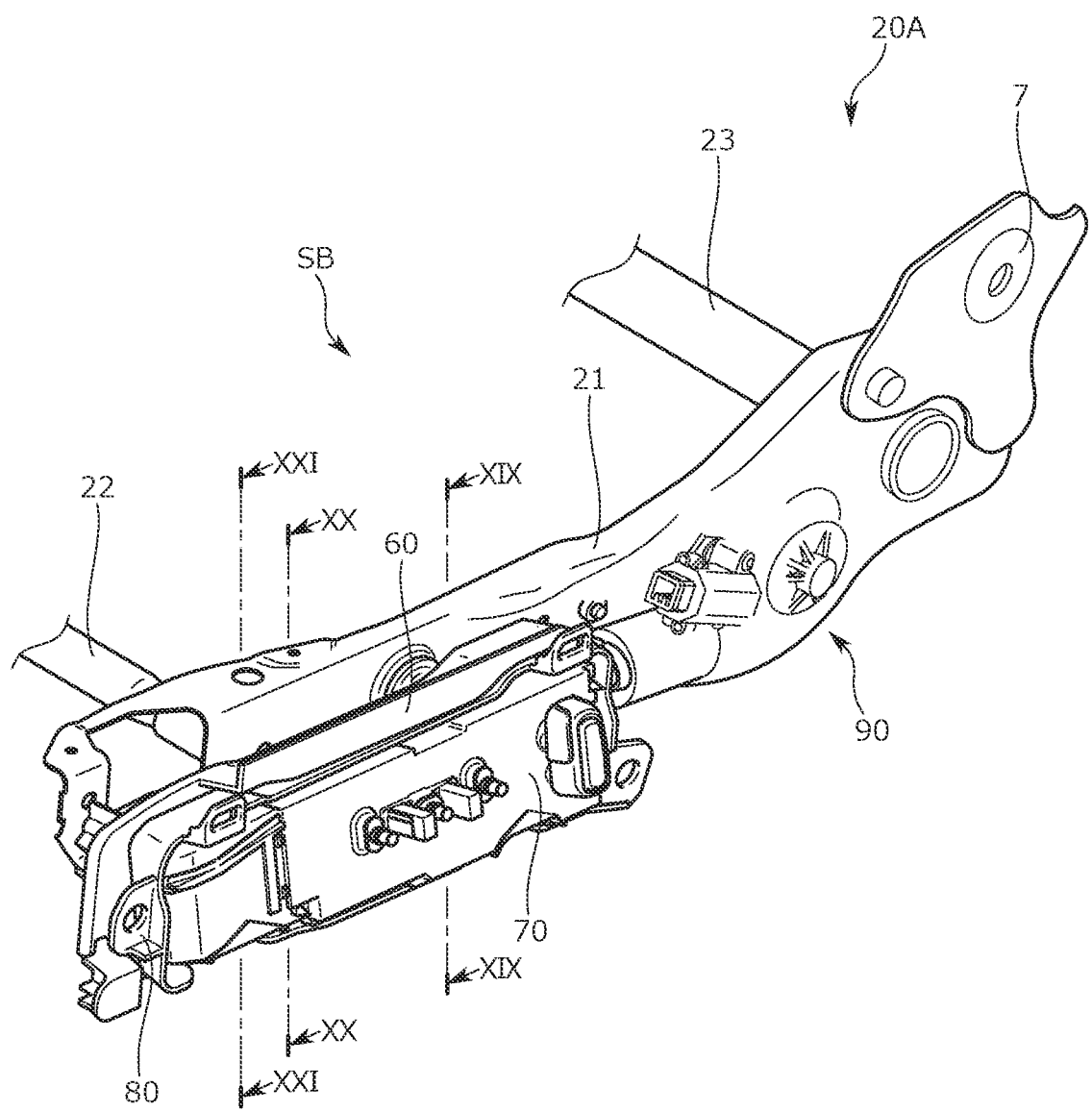
FIG. 15 is a perspective view illustrating the cushion side frame to which a switching unit is attached.
Figure 16:
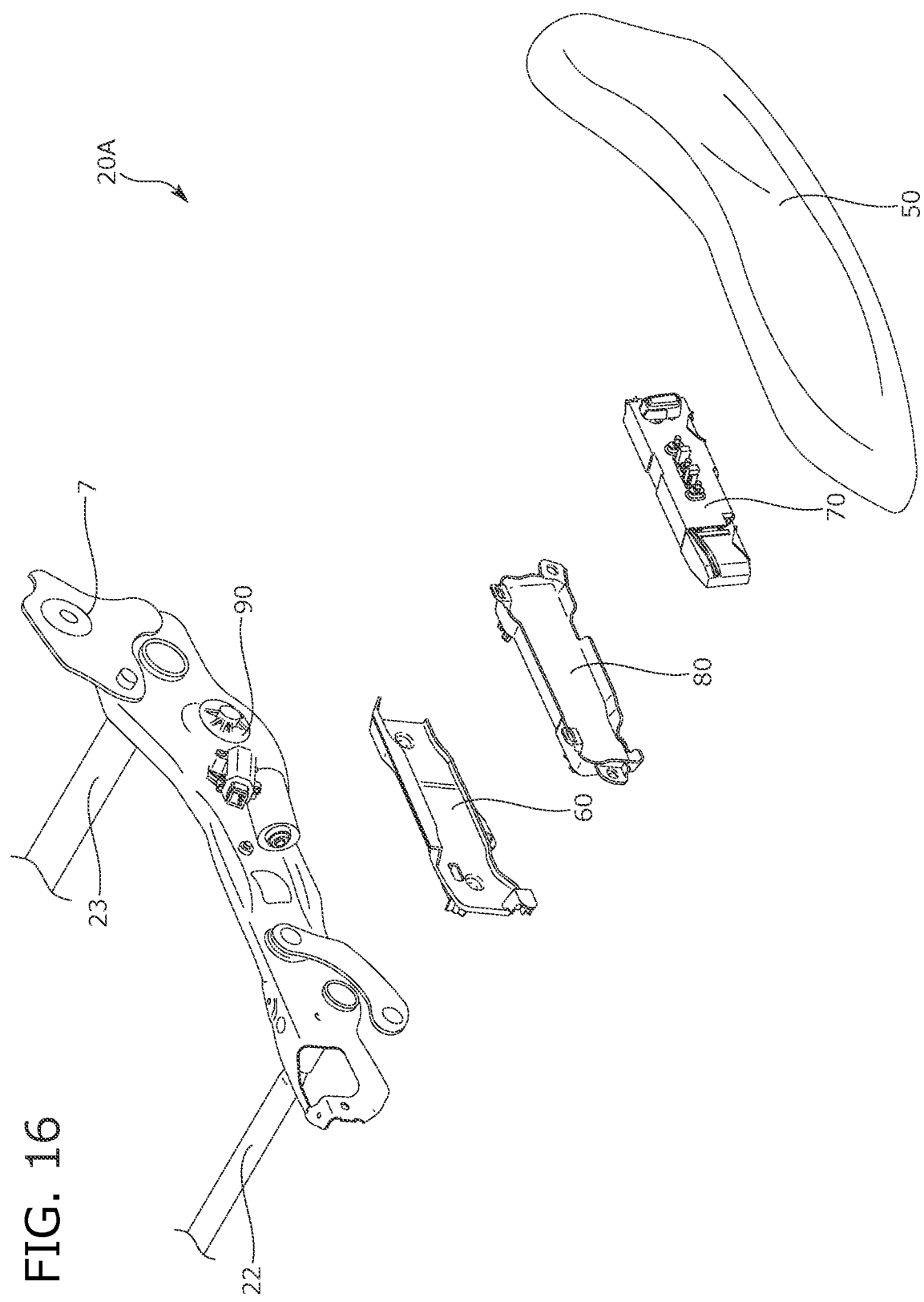

As illustrated in FIG. 15, the vehicle seat SB is provided with the actuator 90 in the outer side portion of the cushion side frame 21 of the seat cushion frame 20A and in front of the reclining mechanism 7. The actuator 90 is an electric mechanism changing, for example, the height of the seat cushion 2.

In addition, the switching unit 70 for operating this actuator 90 is provided further in front of the actuator 90.

<Switching Unit 70>

The switching unit 70 is provided with a plurality of switches 71 and is modularized as one member. The switching unit 70 is connected to the actuator 90 by a cable, and the actuator 90 can be operated by the seated occupant performing a switching operation. Further, the switching unit 70 and the actuator 90 are configured to be covered with the reclining cover 50. The switching unit 70 is attached to the base cover 60 via the unit cover 80 (inner cover) as illustrated in FIG. 15.

The switching unit 70 is positioned inside the base cover 60 in side view and is disposed so as to overlap the fixed position where the base cover 60 is fixed to the cushion side frame 21.

By the switching unit 70 being positioned inside the base cover 60 and disposed so as to overlap the fixed position of the base cover 60, the switching unit 70 is protected against load input from the outside. It should be noted that although the switching unit 70 is fixed by tapping with respect to the unit cover 80, the switching unit 70 may be fixed by a resin claw with respect to the reclining cover 50.

<Unit Cover 80>

The unit cover 80 is a member for covering and protecting the switching unit 70 and fixing the switching unit 70 to the base cover 60. The unit cover 80 is fixed to an outer side surface 62b of the base cover 60 and disposed on the reclining cover 50 side. By fixing the unit cover 80 to the outer side surface 62b of the base cover 60, the rigidity of the base cover 60 is improved and load input can be received more stably.

Figure 17:
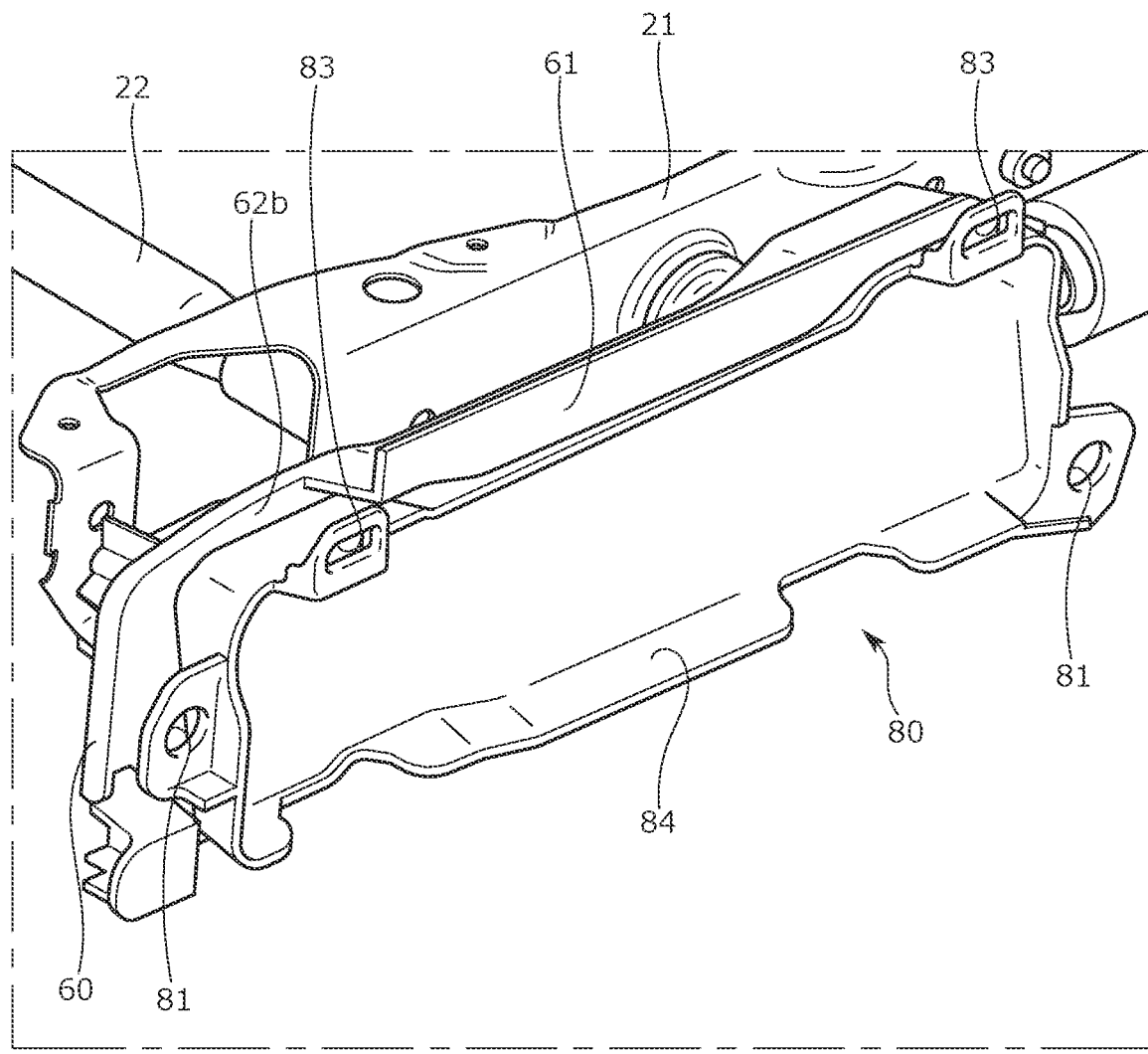
FIG. 17 is a perspective view illustrating a unit cover (inner cover) attached to the base cover, which is seen from the outside of the vehicle seat.
Figure 18:
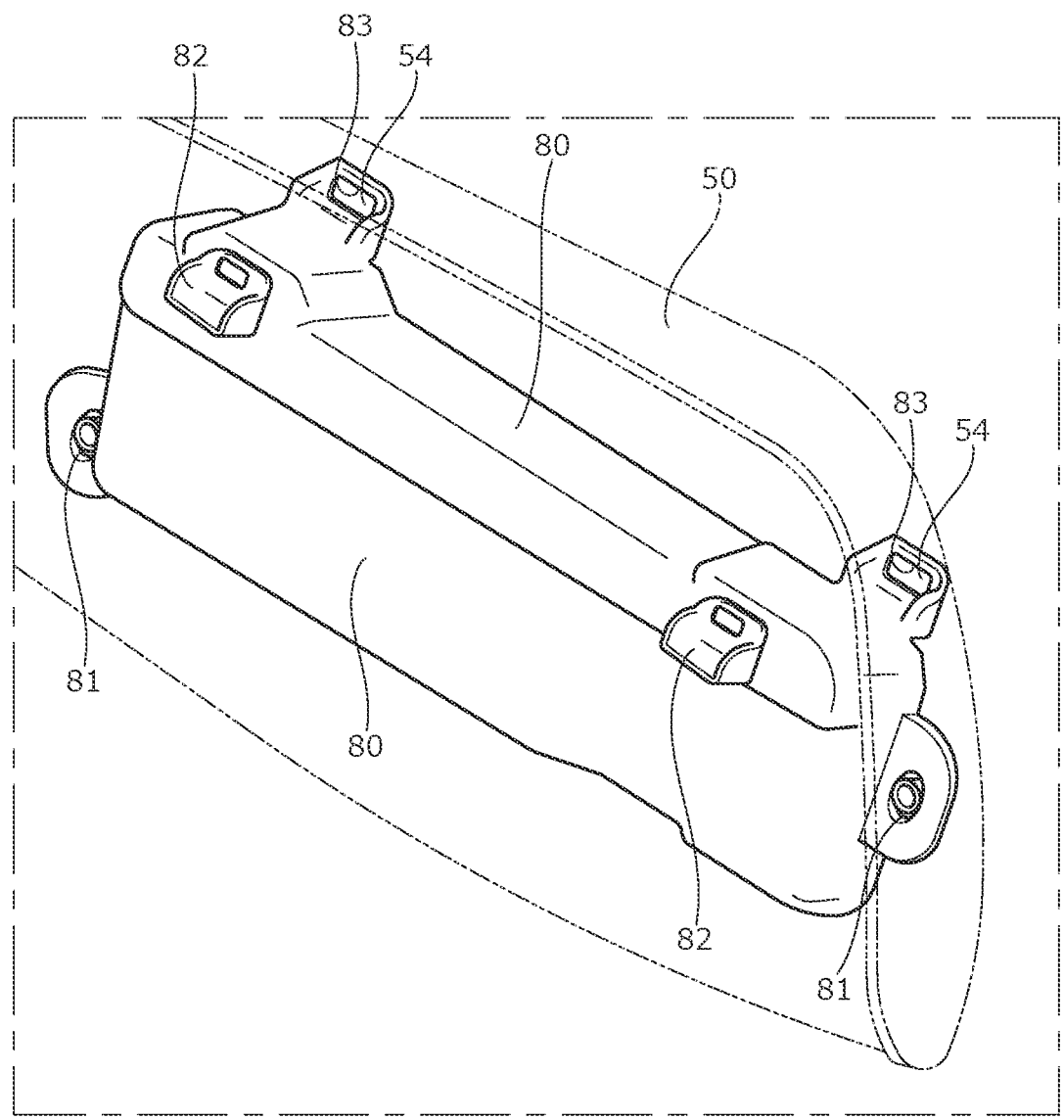
FIG. 18 is a perspective view illustrating the unit cover attached to the reclining cover, which is seen from the inside of the vehicle seat.

As illustrated in FIGS. 15 and 17, the unit cover 80 is provided with tapping fixing portions 81 in the front and rear end portions thereof and can be screwed to the reclining cover 50. In addition, the upper portion of the unit cover 80 is provided with two engaging hole portions 83. As illustrated in FIG. 18, resin claws 54 protruding from the reclining cover 50 are inserted into and engaged with the engaging hole portions 83, and the unit cover 80 is attached to the reclining cover 50 as a result. In addition, two resin claws 82 protrude from the inner wall portion of the unit cover 80, the resin claws 82 are inserted into and engaged with engaging holes 68 of the base cover 60, and the unit cover 80 is attached to the base cover 60 as a result.

Figure 19:
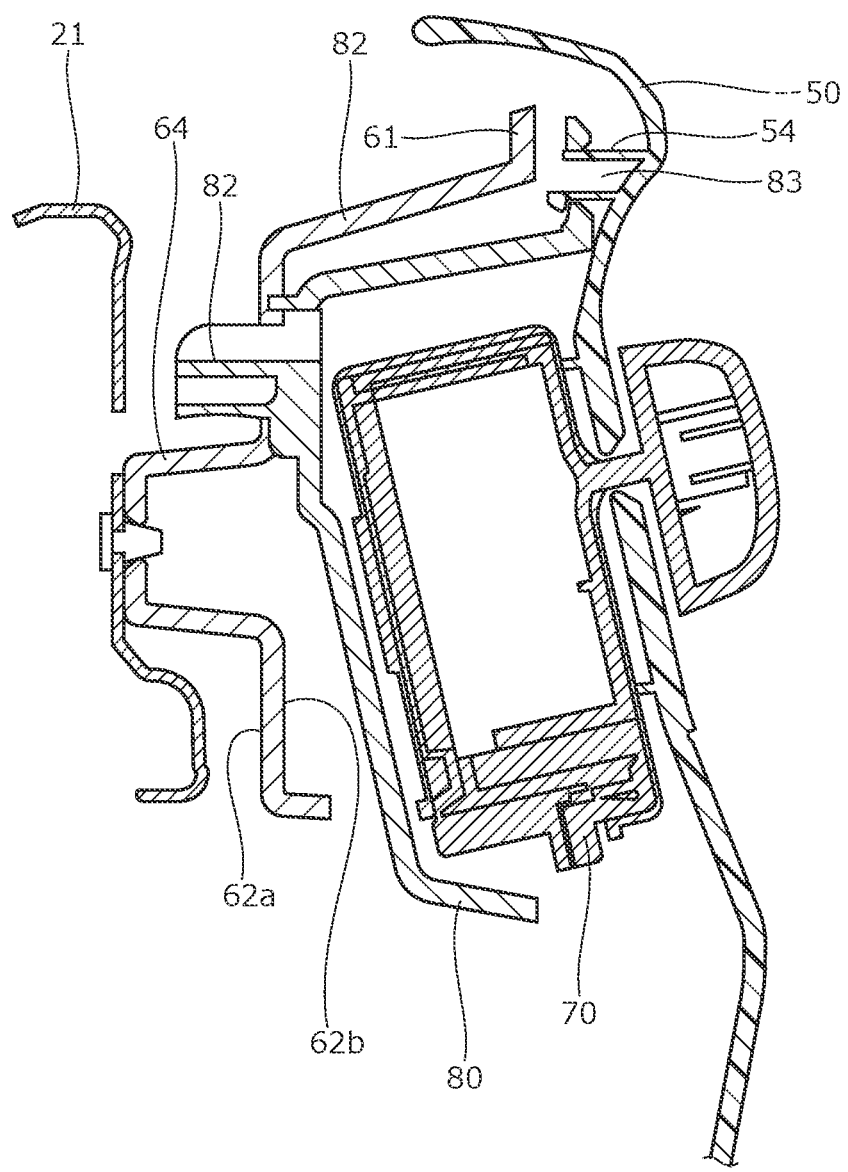
FIG. 19 is a cross-sectional view taken along line XIX-XIX in FIG. 15.
Figure 20:
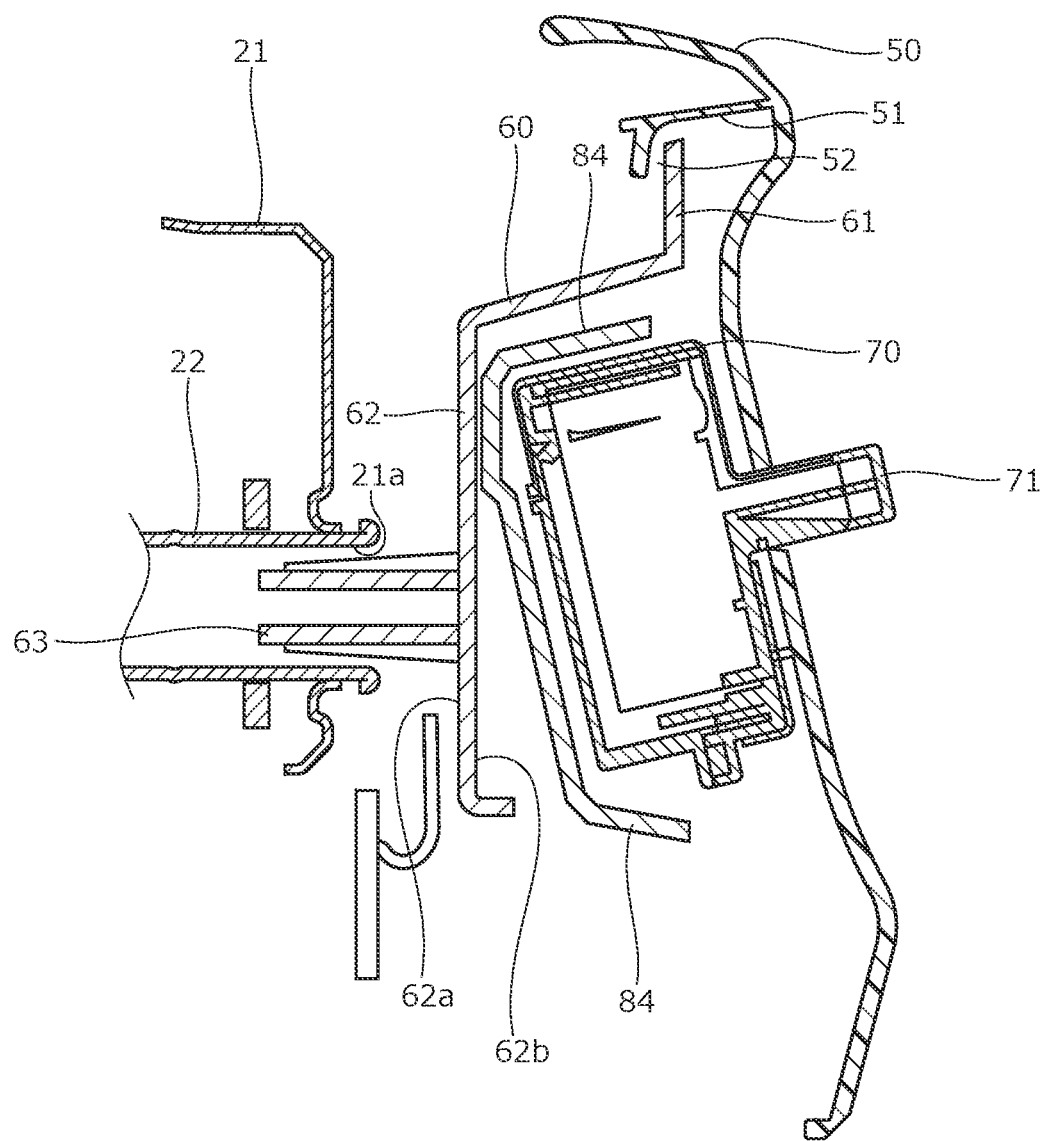
FIG. 20 is a cross-sectional view taken along line XX-XX in FIG. 15.
Figure 21:
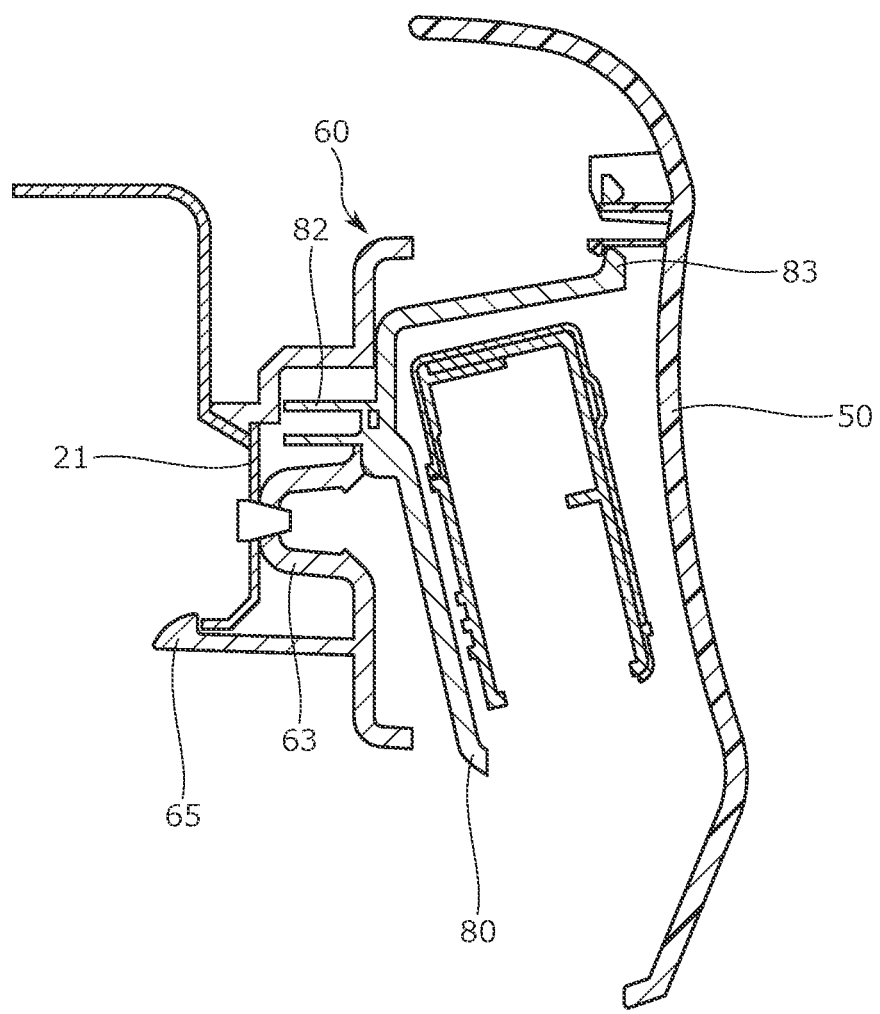
FIG. 21 is a cross-sectional view taken along line XXI-XXII in FIG. 15.

A wall portion 84 is provided on the outer periphery of the unit cover 80 to form a box shape. As illustrated in FIGS. 19 to 21, the switching unit 70 attached to the unit cover 80 is covered and protected from the front, rear, top, and bottom. In addition, the switching unit 70 is disposed between the reclining cover 50 and the unit cover 80 and fixed to the unit cover 80, and thus the switching unit 70 can be protected against load input from the outside.

The vehicle seats SA and SB according to the present embodiment have been described above with reference to the drawings. As described above, the base cover 60 can be used for both the manual-specification vehicle seat SA and the power-specification vehicle seat SB. In addition, in both specifications, the base cover 60 is capable of regulating and fixing the position of the reclining cover 50 and receiving load input to the reclining cover 50.

In addition, although the switching unit 70 is a functional component attached to the base cover 60 in the present embodiment, the functional component is not limited thereto and may be, for example, a touch sensor, an ECU, the actuator 90, and so on.

The second and third embodiments described above will be additionally noted below.

Appendix 1

A conveyance seat including:
a seat cushion;
a seat cushion frame forming a skeleton of the seat cushion and having a pair of cushion side frames;
a reclining mechanism provided in a rear end portion of the seat cushion;
a reclining cover covering an end portion of the reclining mechanism and a side portion of one of the pair of cushion side frames; and
a base cover covering a functional component, attachable to the cushion side frame, fixing the reclining cover to the cushion side frame between the reclining cover and the cushion side frame, and supporting an input load to the reclining cover with the cushion side frame.

Appendix 2

The conveyance seat according to Appendix 1, in which the reclining cover has a support portion where a groove portion is formed inside an upper portion, and

the base cover has a flange portion extending in a seat front to back direction in an upper portion and is fixed to the cushion side frame by inserting the flange portion into the groove portion formed in the support portion of the reclining cover.

Appendix 3

The conveyance seat according to Appendix 2, in which the base cover has a crank-shaped cross section including the flange portion supporting the reclining cover and a fixed part attached to the cushion side frame.

Appendix 4

The conveyance seat according to any one of Appendices 1 to 3, in which
the base cover has a boss formed on an inner side surface,
the cushion side frame has a through hole formed at a position corresponding to the boss, and
positions of the base cover in a front to back direction and an up to down direction with respect to the cushion side frame of the base cover are regulated by inserting the boss of the base cover through the through hole of the cushion side frame.

Appendix 5

The conveyance seat according to any one of Appendices 1 to 4, in which
the base cover has a tapping fixing portion fixed by screwing with respect to the cushion side frame and an engaging claw portion fixed by claw portion engagement, and
the tapping fixing portion and the engaging claw portion are disposed so as to overlap in a front to back direction.

Appendix 6

The conveyance seat according to any one of Appendices 1 to 5, in which
an inner cover is provided between the base cover and the reclining cover, and
the inner cover is fixed to an outer side surface of the base cover.

Appendix 7

The conveyance seat according to Appendix 6, in which the base cover and the inner cover are engaged by a resin claw.

Appendix 8

The conveyance seat according to Appendix 6 or 7, including a switching unit as the functional component,
in which the switching unit is disposed between the inner cover and the reclining cover and fixed to the inner cover.

Appendix 9

The conveyance seat according to Appendix 8, in which the switching unit is positioned inside the base cover in side view and is disposed so as to overlap a fixed position where the base cover is fixed to the cushion side frame.

Appendix 10

The conveyance seat according to any one of Appendices 1 to 9, in which the reclining cover is fixed by hooking a fixing claw provided in a front end portion of the reclining cover on the base cover.

REFERENCE SIGNS LIST

S, SA, SB: vehicle seat (conveyance seat)
T: cushion trim cover (cushion cover)
P: pad
F, FA: seat frame
Sh: seat main body
G: gap
1: seat back
2: seat cushion
3: headrest
4: slide rail
7: reclining mechanism
10: seat back frame
11: upper frame
 11a: headrest guide
12: lower frame
13: back side frame (side frame)
14: first member
 14a: outside surface (first outside surface)
 14b: opening portion
 14c: bulged portion
 14d: notch
15: first connecting portion
 15a: flat surface portion
16: second member
 16a: outside surface (second outside surface)
 16b: opening portion
 16c: bulged portion
17: second connecting portion
 17a: flat surface portion
 17b: flange
20: seat cushion frame
21: cushion side frame (side frame)
22: front connecting frame
23: rear connecting frame
24: cushion pan frame
30: headrest frame
31: headrest pillar
41: lower rail
42: upper rail
50: reclining cover
51: rib (support portion)
52: groove portion
53: fixing claw
54: resin claw
60: base cover
61: flange portion
62: fixed part
 62a: inner side surface
 62b: outer side surface
63: boss
64: tapping fixing portion
65: engaging claw portion
66: abutting protrusion
68: engaging hole
69: wall portion 70: switching unit
71: switch
80: unit cover (inner cover)
81: tapping fixing portion
82: resin claw
83: engaging hole portion
84: wall portion
90: actuator

The invention claimed is:

1. A conveyance seat, comprising a seat main body and a seat frame forming a skeleton of the seat main body, wherein
the seat frame is a seat back frame forming a skeleton of a seat back serving as a backrest portion,
the seat back frame has a pair of side frames disposed to be separated from each other in a seat width direction,
each of the pair of side frames is configured from at least a first member and a second member divided in a longitudinal direction of each of the side frames,
the first member is positioned on an upper side in each of the pair of side frames,
the second member is positioned on a lower side in each of the pair of side frames,
the first member has
a first outside surface that is an outside surface of the first member and extends in the longitudinal direction, and
a first connecting portion for connection to the second member that is provided at a lower end portion of the first member,
the second member has
a second outside surface that is an outside surface of the second member and extends in the longitudinal direction, and
a second connecting portion for connection to the first member that is provided at an upper end portion of the second member,
each of the first connecting portion and the second connecting portion has a flat surface portion extending in the longitudinal direction, and the first member and the second member are connected in a state where flat surfaces of the flat surface portion of the first connecting portion and the flat surface portion of the second connecting portion face and overlap each other,
one of the first connecting portion and the second connecting portion is formed as a stepped portion that is positioned inside with respect to the first outside surface and the second outside surface, and
an outer surface of the stepped portion and an inner surface of the other of the first connecting portion and the second connecting portion contact with each other.

2. The conveyance seat according to claim 1, wherein an upper edge of the second connecting portion extends obliquely with respect to the longitudinal direction in a side view of the seat frame.

3. The conveyance seat according to claim 1, wherein the stepped portion is provided on a side surface and a rear surface of each of the pair of side frames, and comprises a flange extending forward from the rear surface.

4. The conveyance seat according to claim 1, wherein a front portion and a rear portion of the first connecting portion extend toward an inner side in the seat width direction,
a length of the rear portion of the first connecting portion in the seat width direction is longer than a length of the front portion of the first connecting portion in the seat width direction,
a front portion and a rear portion of the second connecting portion extend toward the inner side in the seat width direction,
a length of the rear portion of the second connecting portion in the seat width direction is longer than a length of the front portion of the second connecting portion in the seat width direction, and
the second member includes a flange bent inward from at least one of the front portion and the rear portion of the second connecting portion.

5. The conveyance seat according to claim 1, wherein a plurality of holes is formed in the first member and the second member,
a hole located at the bottom among the plurality of holes formed in the first member is disposed between a hole located at a frontmost position and a hole located at a rearmost position among the plurality of holes formed in the second member when viewed from above,
each of the first member and the second member includes a bulged portion bulged from a side surface of each of the first member and the second member,
the hole located at the bottom among the plurality of holes formed in the first member is arranged between the bulged portion of the first member and the stepped portion in an up to down direction, and
the plurality of holes formed in the second member is located between the bulged portion of the second member and the stepped portion in the up to down direction.

6. The conveyance seat according to claim 1, comprising a lower frame bridging the pair of side frames, wherein an upper portion of each of both ends of the lower frame extends to a lower end of the first connecting portion.

7. The conveyance seat according to claim 1, wherein a length of the first connecting portion in the seat width direction is longer than a length of the second connecting portion in the seat width direction.

8. The conveyance seat according to claim 1, comprising a reclining mechanism provided at lower ends of the pair of side frames, wherein
a connecting portion at which the first member and the second member are connected to each other is located above an upper end of the reclining mechanism.

9. The conveyance seat according to claim 1, wherein a reclining cover is provided below a position where the first member and the second member overlap with each other.

10. The conveyance seat according to claim 1, wherein the first outside surface and the second outside surface are arranged on a same vertical surface in an upper region and a lower region of the stepped portion.

11. The conveyance seat according to claim 1, wherein the first outside surface and the second outside surface are arranged to be flush with each other in an upper region and a lower region of the stepped portion.

12. The conveyance seat according to claim 1, wherein the stepped portion is provided on a side surface and a rear surface of each of the pair of side frames, and
the rear surface includes a notch that is cut out in the seat width direction.

13. The conveyance seat according to claim 1, wherein a gap is provided in an up to down direction between a lower end of the first outside surface and an upper end of the second outside surface at a connecting portion at which the first member and the second member are connected to each other.

* * * * *